United States Patent
Mohri et al.

(10) Patent No.: US 7,405,725 B2
(45) Date of Patent: Jul. 29, 2008

(54) MOVEMENT DETECTION DEVICE AND COMMUNICATION APPARATUS

(75) Inventors: Koh Mohri, Hachioji (JP); Akio Kosaka, Hachioji (JP)

(73) Assignee: Olympus Corporation, Tokyo (JP)

( * ) Notice: Subject to any disclaimer, the term of this patent is extended or adjusted under 35 U.S.C. 154(b) by 316 days.

(21) Appl. No.: 11/190,562

(22) Filed: Jul. 27, 2005

(65) Prior Publication Data

US 2007/0002015 A1    Jan. 4, 2007

Related U.S. Application Data

(63) Continuation of application No. PCT/JP2004/000539, filed on Jan. 22, 2004.

(30) Foreign Application Priority Data

Jan. 31, 2003    (JP) .............................. 2003-024103

(51) Int. Cl.
*G09G 5/00*    (2006.01)
(52) U.S. Cl. ..................... 345/156; 345/157; 345/158
(58) Field of Classification Search ......... 345/156–158, 345/8, 168–169, 862–863, 473–475; 414/1–7; 901/33–34
See application file for complete search history.

(56) References Cited

U.S. PATENT DOCUMENTS

| | | | |
|---|---|---|---|
| 5,097,252 A | | 3/1992 | Harvill et al. |
| 6,070,269 A | * | 6/2000 | Tardif et al. ........................ 2/69 |
| 6,111,580 A | | 8/2000 | Kazama et al. ............. 715/863 |
| 6,285,757 B1 | * | 9/2001 | Carroll et al. ............... 345/619 |

(Continued)

FOREIGN PATENT DOCUMENTS

JP    3-174668 A    7/1991

(Continued)

OTHER PUBLICATIONS

T. Hamada et al; Zenhoi Gazo No Ugoki Vector Kaiseki Ni Yoru Camera Ichi Shisei Suitei Shuho No Ichikento; The Institute of Electronics, Information and Communication Engineers Gijutsu Hohoku, vol. 101, No. 203; Jul. 12, 2001; pp. 117-124.

(Continued)

*Primary Examiner*—Richard Hjerpe
*Assistant Examiner*—Mansour M Said
(74) *Attorney, Agent, or Firm*—Frishauf, Holtz, Goodman & Chick, P.C.

(57) ABSTRACT

A movement detection device includes a self-sustaining movement detection unit which is attached to an operator's body and detects a movement or a posture of an attached part of the operator's body. An image pickup section picks up a projected image from an optical system which simultaneously inputs a peripheral image. An image conversion section converts an all azimuth image picked up by the image pickup section into a cylindrical panorama image. An image recognition section includes cylindrical panorama images at different times. A camera posture estimation section acquires movement information of the image pickup section based on a comparison result of the image recognition section. A space sensor posture estimation section acquires a position/posture of the attached part in a space based on information of the self-sustaining movement detection unit and the camera posture estimation section.

21 Claims, 11 Drawing Sheets

U.S. PATENT DOCUMENTS

| | | | |
|---|---|---|---|
| 6,380,923 B1 * | 4/2002 | Fukumoto et al. | 345/156 |
| 6,515,669 B1 * | 2/2003 | Mohri | 345/474 |
| 6,744,420 B2 * | 6/2004 | Mohri | 345/157 |
| 2002/0012014 A1 | 1/2002 | Mohri | |

FOREIGN PATENT DOCUMENTS

| | | |
|---|---|---|
| JP | 10-148640 A | 6/1998 |
| JP | 10-171591 A | 6/1998 |
| JP | 2000-97637 A | 4/2000 |
| JP | 2000-132305 A | 5/2000 |
| JP | 2000-132329 A | 5/2000 |
| JP | 2002-7030 A | 1/2002 |
| JP | 2002-189543 A | 7/2002 |

OTHER PUBLICATIONS

I. Yamasawa; Mirror O Mochiita Zenhoi Camera No Genri To Tokucho; Information Processing Society of Japan Kenyu Hokoku Computer Vision To Image Media; vol. 2001; No. 4, Information Processing Society of Japan, Jan. 19, 2001; pp. 155-160.

Translation of the Written Opinion of the International Searching Authority for PCT/JP2004/000539,10 sheets.

* cited by examiner

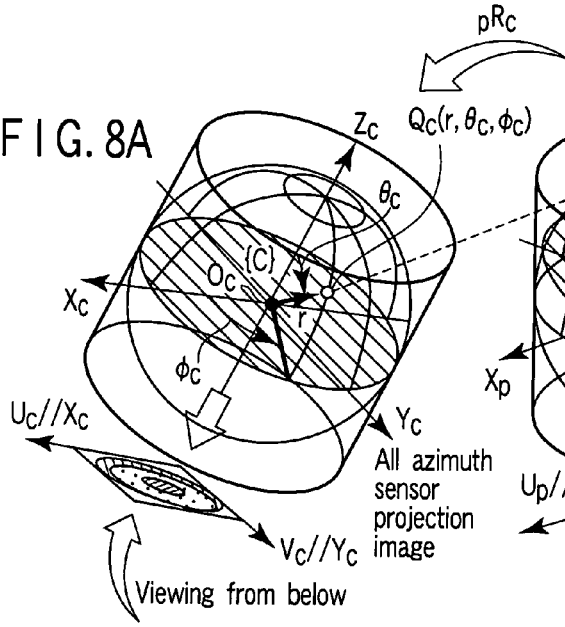
FIG. 8A
Panorama coordinate system {C} fixed to camera coordinate system
FIG. 8B
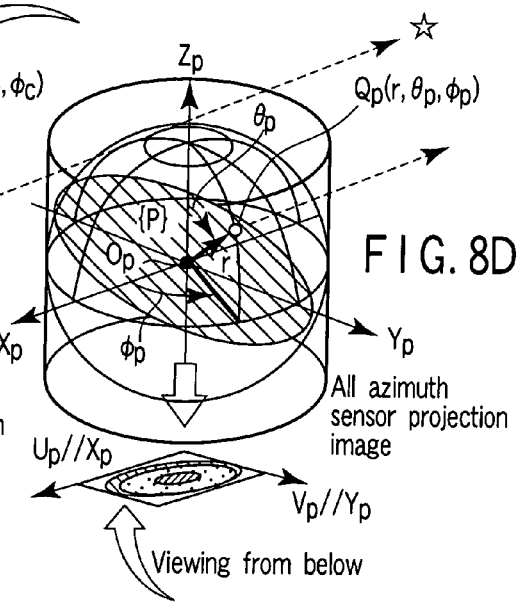
Panorama coordinate system {P} fixed to world coordinate system
FIG. 8D
FIG. 8E
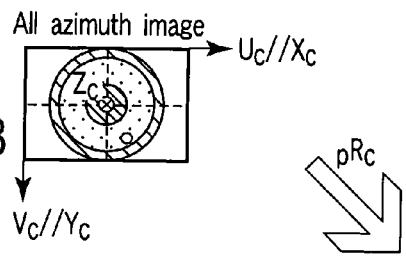
FIG. 8C
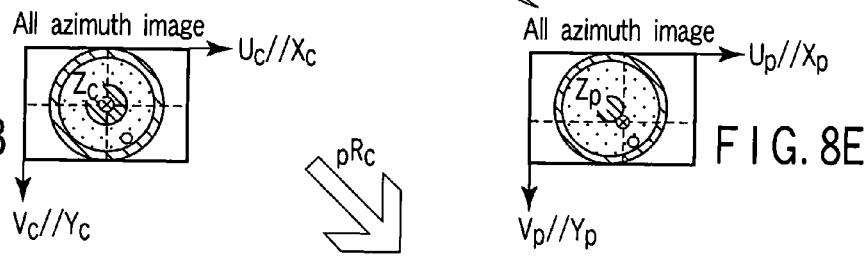
FIG. 8F

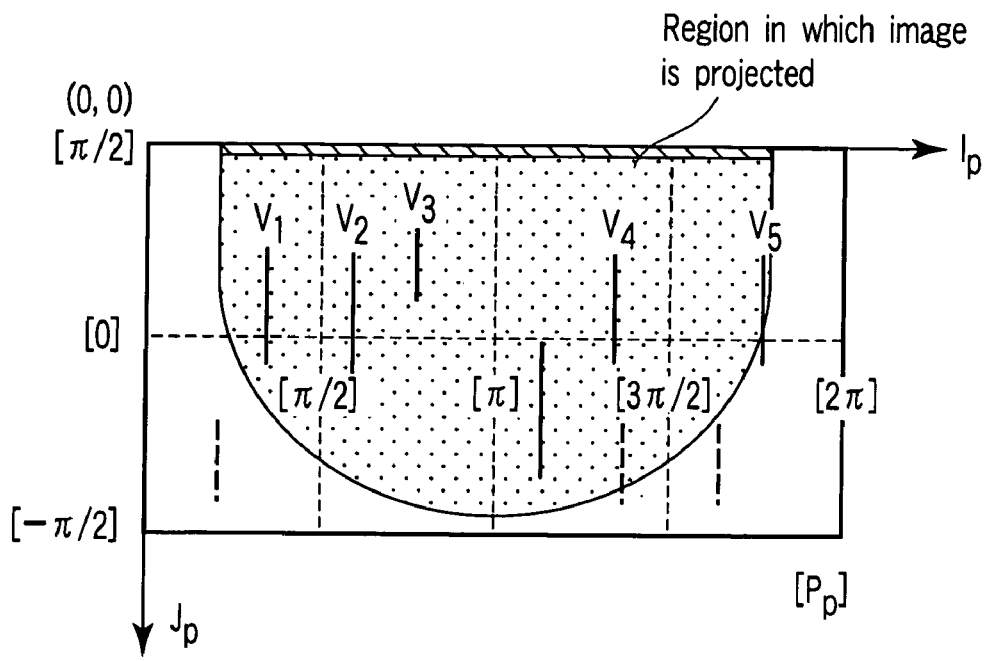
F I G. 17A
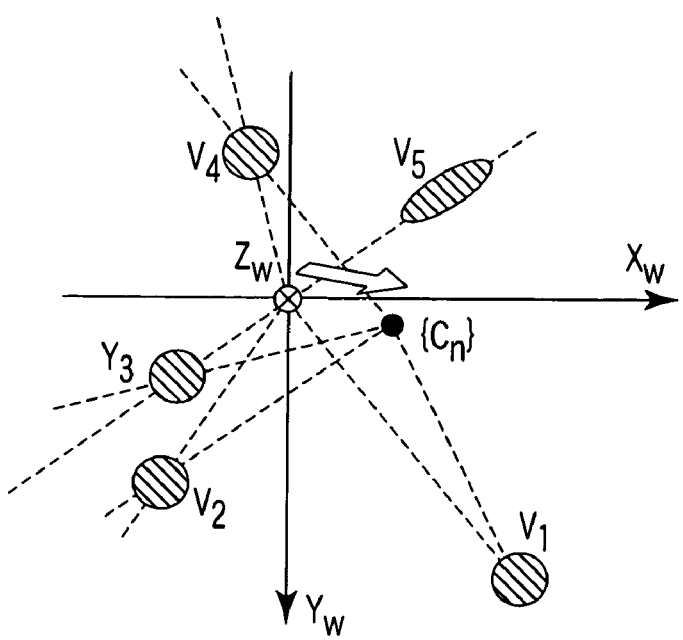
F I G. 17B

MOVEMENT DETECTION DEVICE AND COMMUNICATION APPARATUS

CROSS-REFERENCE TO RELATED APPLICATIONS

This is a Continuation Application of PCT Application No. PCT/JP2004/000539, filed Jan. 22, 2004, which was published under PCT Article 21(2) in Japanese.

This application is based upon and claims the benefit of priority from prior Japanese Patent Application No. 2003-024103, filed Jan. 31, 2003, the entire contents of which are incorporated herein by reference.

BACKGROUND OF THE INVENTION

1. Field of the Invention

The present invention relates to a movement detection device which measures action of a person, movement of a part of a body or the like, and a communication apparatus for mutual communication of information between the movement detection device and another control device.

2. Description of the Related Art

Techniques have heretofore been known in which sensors are attached to operators' hands, and shapes or movements of the hands are detected by the sensors to produce commands or statuses based on the detection results. For example, in U.S. Pat. No. 5,097,252, a technique has been proposed in which a plurality of sensors each constituted by connecting a light source to a photo sensor via a light guiding path such as an optical fiber are attached to hand joints to detect bending of the joints. In recognizing a spatial position of the hand, there has been an example in which an ultrasonic sensor is disposed in a corner of a monitor, a signal from an ultrasonic transmitter attached to the hand is measured, and a signal from the ultrasonic transmitter attached to the hand is measured to thereby measure the spatial position of the hand with respect to the monitor.

Moreover, in another example, a reference magnetic field is applied beforehand to the vicinity of a plate to be measured using an alternating magnetic field generator which generates a static magnetic field in an XYZ direction, and a magnetic sensor which detects the magnetic field of the XYZ direction is attached to a measuring object. A device which measures a position and a posture from the reference magnetic field of the measuring object from a relation between a signal intensity measured by the magnetic sensor and a distance in this state has also been utilized.

Further in other examples, many systems have been proposed in which a light source (LED, lamp, laser light, etc.) constituting a reference position is used, a light receiving element (PD), a position detection element (PSD, CCD), an optical system and the like are combined, and the position or the posture is measured utilizing a principle of trigonometrical measurement. For example, in Jpn. Pat. Appln. KOKAI Publication No. 10-148640, a hand gesture detection device has been proposed in which four light emitting elements are combined with one light receiving element, and movement direction or movement speed of the hand is detected in accordance with a sum of received amounts of reflected light. In Jpn. Pat. Appln. KOKAI Publication No. 10-171591, a movement detection device has been proposed which detects a movement position of a pointing device by a global positioning system (GPS) measuring system.

Furthermore, in Jpn. Pat. Appln. KOKAI Publication No. 2000-132305 by the present applicant, an operation input device has been proposed in which inertial sensors (triaxial angular velocity sensor and triaxial acceleration sensor) to detect positions and postures are disposed in positions of the back of the hand, the position/posture of the back of the hand is obtained by strap-down calculation, uniaxial angular velocity sensors to detect the bending of fingers are disposed on an end portion of an index finger, an end portion of a middle finger, and end and middle portions of a thumb to estimate shapes of hand/fingers from the posture of the back of the hand and the postures of the fingers, and command signals are generated based on the estimated shapes or gestures such as movements of the hand/fingers.

BRIEF SUMMARY OF THE INVENTION

According to a first aspect, there is provided a movement detection device to detect a position/posture of an object itself which is equipped with a self-sustaining movement detection section that does not require any other reference device, comprising:

an image pickup section fixed to the self-sustaining movement detection section, which projects an image around the object to continuously pick up the projected image;

an image conversion section which converts the projected image picked up by the image pickup section into a cylindrical panorama image;

an image recognition section which compares and recognized two cylindrical panorama images converted at different times by the image conversion section;

a camera posture estimation section which estimates position/posture information of the object based on a recognition result of the image recognition section; and a space sensor posture estimation section which estimates the position/posture of the object in a space based on a detection result of the self-sustaining movement detection section and an estimation result of the camera posture estimation section, wherein the image conversion section converts the image into a gravity correction panorama image in consideration of a direction of a vector of a gravity axis direction and a rotation angle around a gravity axis, detected by the self-sustaining movement detection section, when converting the image picked up by the image pickup section into the cylindrical panorama image.

BRIEF DESCRIPTION OF THE SEVERAL VIEWS OF THE DRAWING

FIGS. 8A to 8F are comparison diagram of a conventional panorama image with a panorama image obtained by use of the movement detection device according to the embodiment of the present invention;

FIG. 17A is an image diagram of a vertical characteristic line in a gravity panorama image;

FIG. 17B is an image diagram showing a state of the characteristic point in a world coordinate space in the gravity panorama image.

DETAILED DESCRIPTION OF THE INVENTION

An embodiment of the present invention will be described hereinafter in detail with reference to the drawings.

Figure 1:
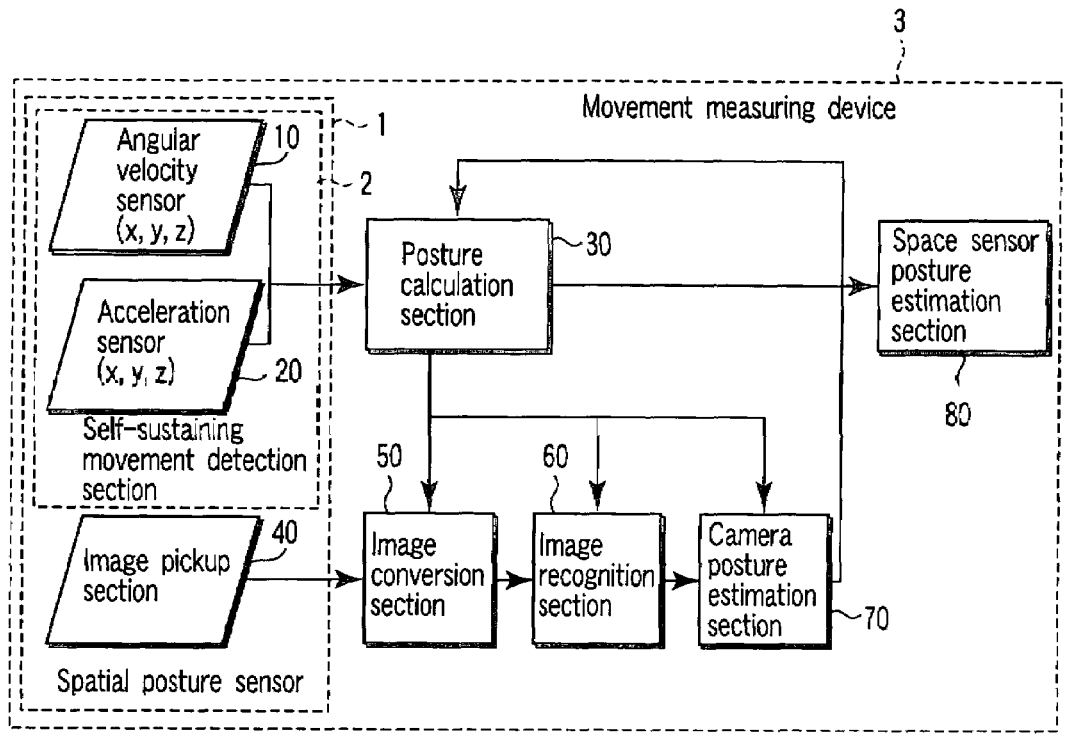
FIG. 1 is a block diagram showing an outline of a functional operation of a movement detection device according to an embodiment of the present invention.
Figure 3:
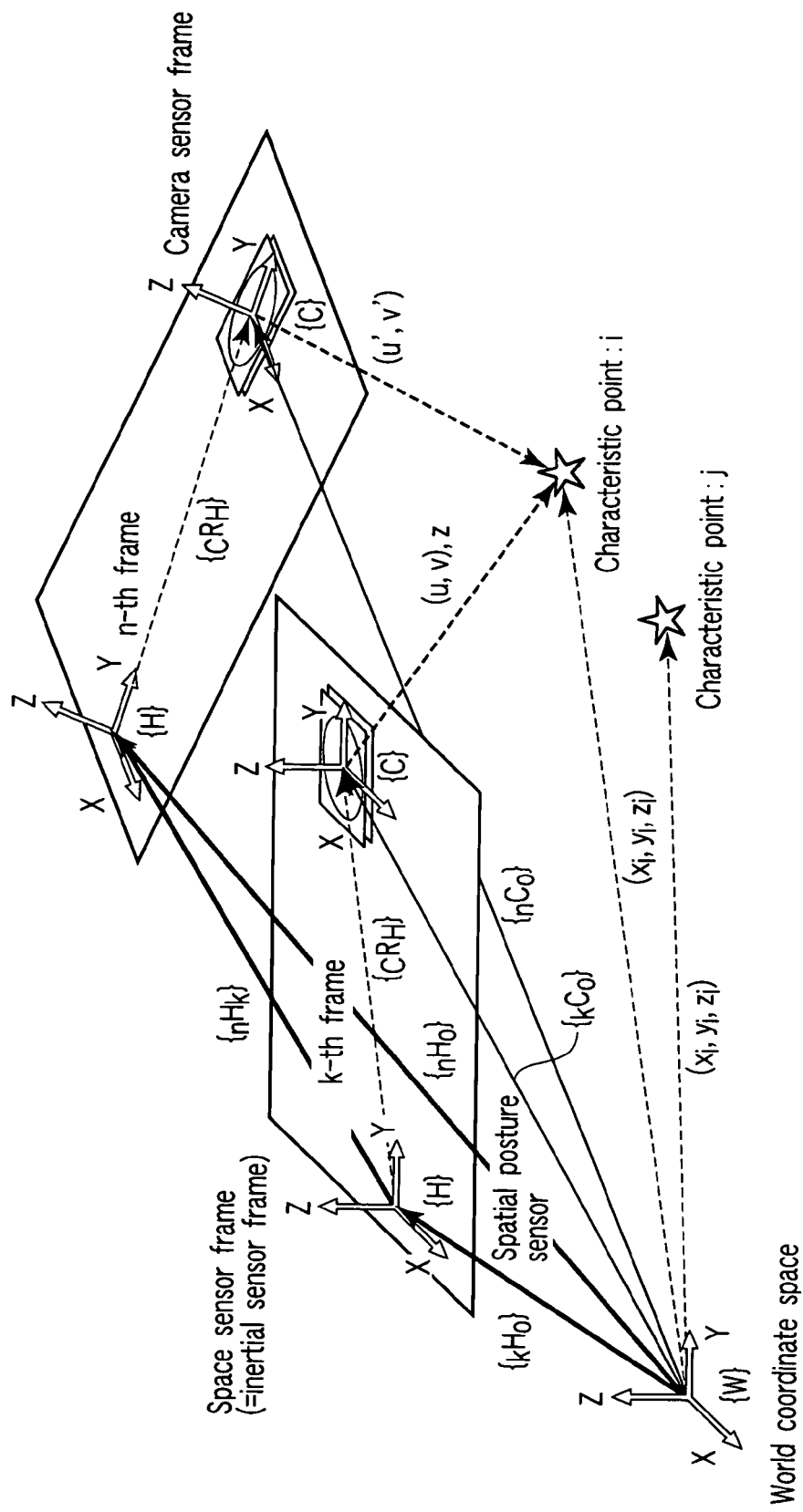
FIG. 3 is a relation diagram between a space sensor frame and a camera sensor frame with respect to a world coordinate space.

First, a general constitution of a spatial posture sensor system (movement measuring device 3) including a movement detection device according to the embodiment of the present invention is shown in FIG. 1. A relation of a posture frame of each sensor in a world coordinate space {W} is shown in FIG. 3.

That is, the movement detection device which detects a posture/position (pose) with respect to the world coordinate space {W} in FIG. 1 is a spatial posture sensor 1. A frame representing the position/posture to be obtained by the spatial posture sensor 1 is a space sensor frame {H} shown in FIG. 3.

In FIG. 1, the spatial posture sensor 1 comprises: a self-sustaining movement detection section 2 comprising inertial sensors of an angular velocity sensor 10 and an acceleration sensor 20; and an image pickup section 40.

The triaxial angular velocity sensor 10 and the triaxial acceleration sensor 20 included in the self-sustaining movement detection section 2 are fixed/disposed in an XYZ-axis direction on the space sensor frame {H}, and the image pickup section 40 is also fixed on the same frame, that is, the same support member.

In the self-sustaining movement detection section 2, inertial sensor frames which are the angular velocity sensor 10 and the acceleration sensor 20 and a camera sensor frame {C} which is the image pickup section 40 are both fixed to the space sensor frame {H}, and therefore these frames constitute a coordinate system which changes by movement of the spatial posture sensor 1 itself every moment.

Here, to facilitate handling, it is assumed that the inertial sensor frame of the self-sustaining movement detection section 2 coincides with the frame of the spatial posture sensor 1. Camera position/posture information obtained by the image pickup section 40 is position/posture information of the camera sensor frame {C} with respect to the world coordinate space {W}.

Signals from the self-sustaining movement detection section 2 are taken by a posture calculation section 30, and thereafter utilized in a process of calculating posture information of the self-sustaining movement detection section 2. It is to be noted that this process will be described later in detail.

Moreover, peripheral image information continuously taken by an optical system which projects a peripheral image and the image pickup section 40 which converts the projected image into image information is converted into a cylindrical panorama image by an image conversion section 50.

Thereafter, in an image recognition section 60, a process of extracting a characteristic point from the cylindrical panorama image converted by the image conversion section 50, and a process of tracing the characteristic point from the previous converted image are performed.

Following these processes, in a camera posture estimation section 70, the position/posture of the camera sensor frame {C} is estimated by characteristic point tracing information acquired by the image recognition section 60, and posture information of the self-sustaining movement detection section 2 acquired by the posture calculation section 30, that is, posture information of the spatial posture sensor 1.

Moreover, the information of the position/posture of the camera sensor frame {C} estimated by the camera posture estimation section 70 is utilized in a process for correcting the posture information of the spatial posture sensor 1 in the posture calculation section 30.

Furthermore, in a space sensor posture estimation section 80, the posture information obtained in the posture calculation section 30 is converted into the space sensor frame {H} in the world coordinate space {W}.

It is to be noted that in the image conversion section 50 and the image recognition section 60, a calculation process cost is lowered by utilization of the information of the spatial posture sensor from the posture calculation section 30.

Next, an outline of an operation input device utilizing the spatial posture sensor of FIG. 1 will be described.

Figure 2:
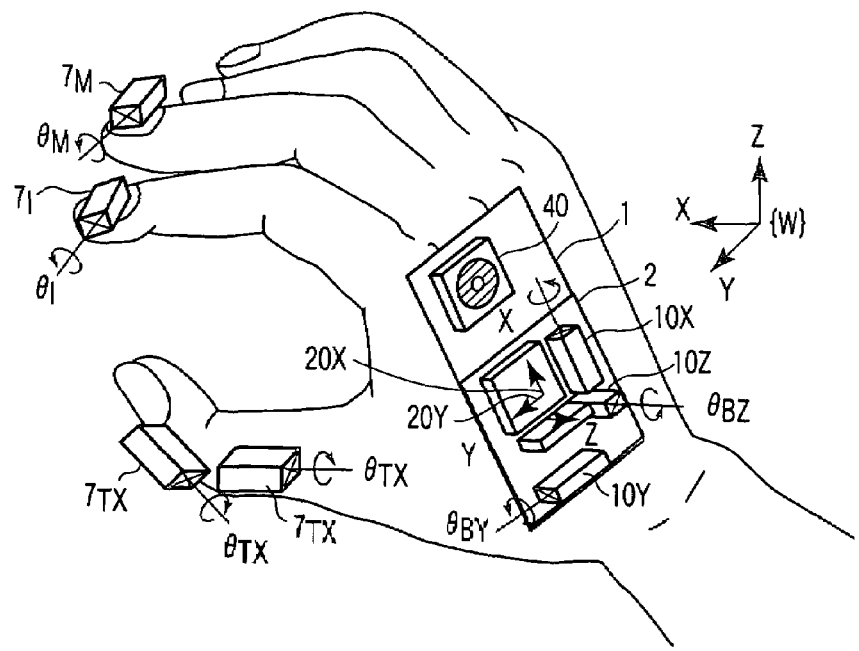
FIG. 2 is a schematic diagram of an operation input device including an image pickup section.

FIG. 2 shows an outline of the operation input device in which the spatial posture sensor 1 comprising an all azimuth image sensor 40a which is the above-described image pickup section 40 on the same substrate as that of a movement detection sensor group (the above-described self-sustaining movement detection section 2) for detecting the position/posture is attached to a hand and used.

It is to be noted that here, the self-sustaining movement detection section 2 comprises a sensor group including the above-described triaxial angular velocity sensors 10X, 10Y, 10Z (hereinafter collectively referred to as the angular velocity sensor 10) and triaxial acceleration sensors 20X, 20Y, 20Z (hereinafter collectively referred to as the acceleration sensor 20) in order to detect the position, posture, and movement of an operator's hand.

In this case, rotary movement and translational movement of the back of the hand can be obtained by subjecting information obtained from the acceleration sensor 20 and the angular velocity sensor 10 to a strap-down calculation process.

However, acceleration information by inertial movement output from the acceleration sensor 20 is zero in a case where there is not any acceleration movement, that is, an object moves at a constant speed or stops. In these two cases, an operation state of the operation input device cannot be distinguished by the acceleration sensor 20. In the translational movement, a speed is obtained by time integration of acceleration signals for one time, and a distance can be obtained by the time integration for another time. However, large errors are generated by two time integrations and noise components of the signal.

Furthermore, since an error component by a drift is added to rotation posture information by the angular velocity sensor 10, a correction process is performed in such a manner that a gravity acceleration component of the acceleration sensor 20 is a reference. However, since a gravity vector does not have any rotation information around a gravity axis, the rotation around the gravity axis cannot be performed in the correction process.

Therefore, in the present embodiment, the image pickup section comprises the all azimuth image sensor 40a which projects a peripheral image on the image pickup section to detect movement information of space six-axis directions.

It is to be noted that the optical system for use in this all azimuth image sensor 40a includes a fisheye lens disposed in such a manner that an optical axis direction coincides with a hand-back Z-coordinate axial direction (hand back plane vertical direction) and having a field angle of 180°.

Therefore, images of whole sky periphery are simultaneously picked up on the side of a wearer's hand back, and relative movement between the all azimuth image sensor 40a and a peripheral object can be known from changes of the images. Information of relative movement detected by the all azimuth image sensor 40a and information of the self-sustaining movement detection section 2 are subjected to sensor fusion, and accordingly the posture and position of the hand back in the space can be measured with a higher precision.

On the other hand, the optical axial direction is not limited to the above-described hand-back Z-coordinate axial direction, and the direction can be switched and used by a measuring environment, a movement direction especially requiring precision as the movement information, or the like. The switching may be switched and used at a utilization time. The field angle is not limited to 180°, and a wider field angle may be set.

Here, when an only movement detection device part of the operation input device is considered, the only self-sustaining movement detection section 2 comprising the acceleration sensor 20 and the angular velocity sensor 10 and the spatial posture sensor 1 comprising the image pickup section 40 to acquire the posture from the peripheral image are noted, and a sensor group 7 does not have to be considered.

Figure 4A:
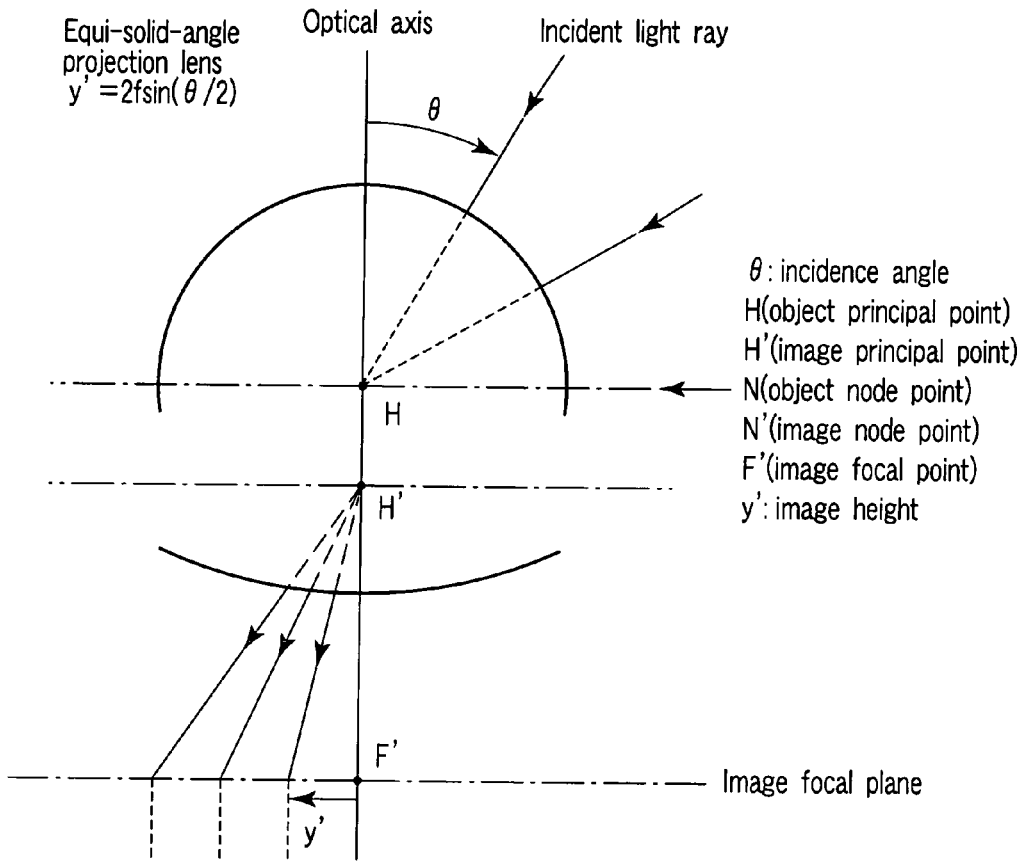
FIG. 4A is a diagram showing a relation between a light ray which strikes on an equi-solid-angle projection lens and the projected image.
Figure 4B:
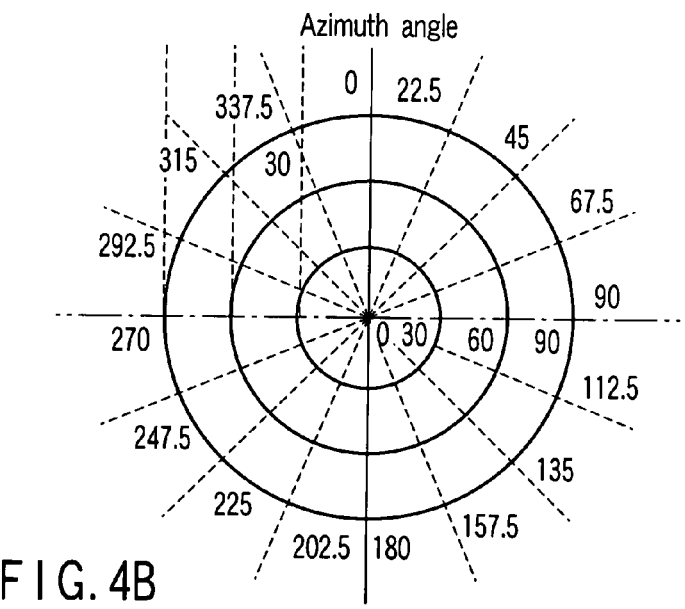
FIG. 4B is a diagram showing a relation between an incidence angle and an azimuth angle of a total azimuth image.

FIG. 4A shows outlines of an incident light ray and an emitted light ray of the optical system of the present embodiment. FIG. 4B is a diagram showing a relation of an image height and a relation of an azimuth angle with respect to an incident light ray angle on a projected image.

It is to be noted that this optical system comprises an example of an equi-solid-angle projection lens in which an image height (y') in an image forming plane is $y'=2f \cdot \sin(\theta/2)$ with respect to an incidence angle ($\theta$). In this case, an obtained image is an image which is proportional to an apparent area of an object, that is, a solid angle of the object. However, a shape of an image changes and becomes flat as the incidence angle increases. In the optical system, the field angle is 180°. When the optical axis is directed in a zenith direction, the image of the whole sky periphery is projected. As shown in FIG. 4B, the projected image is a circular image (hereinafter referred to as an all azimuth image).

The incident light ray is projected on a circumference of a concentric circle of an all azimuth image with respect to the angle from the zenith, that is, an angle ($\theta$) with respect to an optical axis center from an injection relational equation of the optical system. That is, a projection position changes to a position in which a radius of the concentric circle of FIG. 4B increases, as the angle increases, that is, there is a tilt in a horizontal direction. For example, a light ray having an incidence angle of 90° is a light ray from a horizontal line, and is projected on an end of the circumference. The light ray from an azimuth angle direction is projected on a line which coincides with the azimuth angle of the center line of the circle of the all azimuth image.

Therefore, a center position and radius of the circle on the all azimuth image are known. Therefore, when a two-dimensional coordinate position on the all azimuth image sensor 40a is given, the incidence angle and azimuth angle of the incident light ray can be obtained.

It is to be noted that here the optical system is an optical system having a super-wide field angle, and may be an optical system in which a point in the space and a point on the image can be formulated, and the projection system is not limited to the system described herein. For example, a pinhole camera having the super-wide field angle can be derived by a relational equation ($y'=f \cdot \tan\theta$) by center projection. In an fisheye lens and the like, optical systems such as an equidistance projection lens ($y'=f\theta$), an orthogonal projection lens ($y'=f \cdot \sin\theta$), and a solid projection lens ($y'=2f \cdot \tan(\theta/2)$) can be used.

Figure 5:
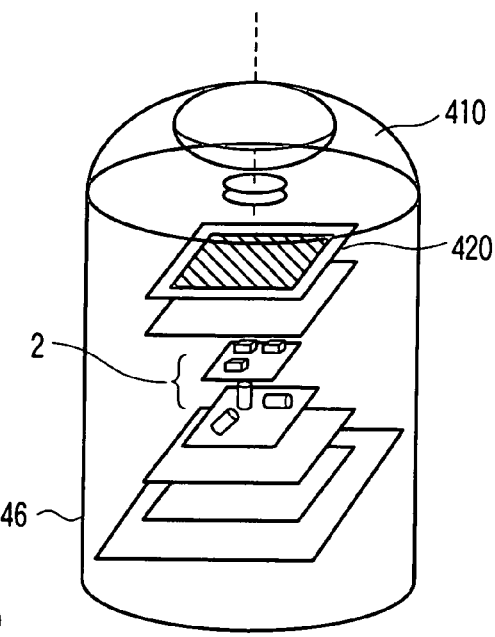
FIG. 5 is a diagram showing another constitution example of an operation input device in which an image processing chip having an image space sensor mounted thereon is disposed.

FIG. 5 shows an example of another mounting mode of the movement detection device in which the image pickup system by the all azimuth image sensor optical system and the self-sustaining movement detection section 2 are incorporated. In this example, a lens 410 of a super-wide-angle optical system is disposed on an upper part of a cylindrical housing 46, and an image pickup element 420 is disposed under the lens in such a manner as to achieve the above-described projection conditions. It is to be noted that the present optical system is an image forming system such as a pinhole camera, and an image focused to a far point from a near point. Further under the element, the self-sustaining movement detection section 2 comprising the angular velocity sensor and the acceleration sensor is disposed in such a manner that spatial three-axis directions crossing one another at right angles can be detected. Additionally, a processing system to process these signals is incorporated, and the position/posture in the space can be detected by this device alone.

Moreover, FIGS. 6A, 6B and 7A, 7B show modifications using other optical systems, and picked-up images by the modifications.

Figure 6A:
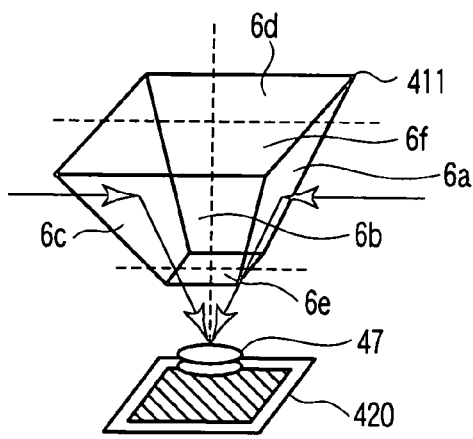
FIG. 6A is a constitution diagram of an optical system by a four-surface mirror system.
Figure 6B:
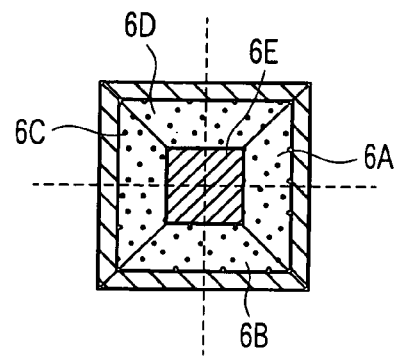
FIG. 6B is a diagram showing a picked-up image by the optical system of the four-surface mirror system.

FIG. 6A shows a constitution example in which four plane mirrors 6a, 6b, 6c, 6d are attached to side surfaces of a quadrangular pyramid 411. This quadrangular pyramid 411 has a shape whose vertex side is cut, and disposed in an inverted manner as shown. In this case, images reflected by the plane mirrors 6a, 6b, 6c, 6d are projected on the image pickup element 420 through an image forming lens system 47. A bottom surface 6f and an upper surface 6e of the quadrangular pyramid 411 are both transparent or transmitting, and a peripheral image of an optical axis direction of the image forming lens system 47 is transmitted through the bottom surface 6f and the upper surface 6e, and thereafter projected on the image pickup element 420. Therefore, as shown in FIG. 6B, images of five axial directions in total, including images 6A, 6B, 6C, 6D in four directions crossing the lens optical axis at right angles and an image 6E of the optical axis direction are simultaneously picked up. It is to be noted that when the number of mirrors is further increased, it is also possible to photograph the images of more directions. Since the projected image by the optical system is center projection divided into five regions, a spatial position direction of the characteristic point can be easily obtained by a linear transformation equation of image information.

Figure 7A:
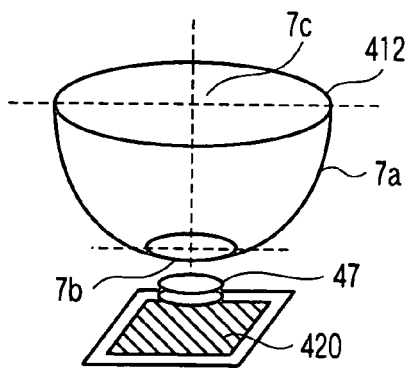
FIG. 7A is a constitution diagram of an optical system by a paraboloid mirror system.

Next, FIG. 7A shows a modification utilizing a paraboloid mirror. In this example, a mirror constituted of an outer surface of a paraboloid shape 412 is disposed. A peripheral image reflected by a paraboloid mirror 7a is projected on the image pickup element 420 through the image forming lens system 47. It is to be noted that a vertex of the paraboloid shape 412 is cut in the same manner as described above. An upper surface 7c and a bottom surface 7b are both transparent or transmitting, and the peripheral image of the optical axis direction of the image forming lens system 47 is passed through these surfaces, and thereafter projected on the image pickup element 420.

Figure 7B:
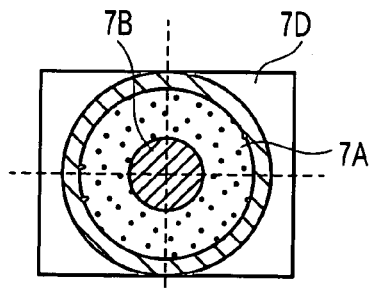
FIG. 7B is a diagram showing a picked-up image by the optical system of a paraboloid mirror.

Therefore, as shown in FIG. 7B, an image 7A of all directions crossing the optical axis at right angles and an image 7B of the optical axis direction are simultaneously picked up. Furthermore, an image of a reflected image by the paraboloid mirror is circular, but an image 7D of the same direction as that of a middle transmitted image is projected outside the circular image. In this example, images more than those in the plane mirror type can be simultaneously picked up.

Next, a relation between the all azimuth sensor coordinate system {C} which is the camera sensor frame of the all azimuth image sensor (slant line portions shown in the figure shows an $X_c$-$Y_c$ plane) and a conventional panorama coordinate system is shown in FIGS. 8A to 8C.

FIG. 8A shows a plane which enters the all azimuth image sensor in an image plane of spherical body. The incident light ray strikes on a center position $O_c$ of this spherical body. This incident light ray intersects with a position $Q_c$ of a spherical surface. Moreover, the ray is converted by a relation between an incidence angle ($\theta_c$, $\phi_c$) and the equi-solid-angle projection lens, and thereafter strikes on an image sensor. At this time, an all azimuth image is produced on the image sensor as shown in FIG. 8B.

Moreover, a cylinder shape shown in FIG. 8A is a panorama image cylindrical surface disposed for easily understanding a positional relation between the image and spherical surface at a time when the all azimuth image is developed into a cylindrical panorama image centering on an optical axis center point. That is, this panorama image cylindrical surface is two-dimensionally developed to obtain a cylindrical panorama image shown in FIG. 8C.

The cylindrical shape of the cylindrical panorama image is fixed to the camera coordinate system in which the optical axis of the all azimuth image sensor constantly coincides with a rotation center axis.

Here, the all azimuth image obtained from all azimuth image sensor fixed to the camera coordinate system {C} forms an image as if viewed from below constantly with respect to a $Z_c$-axis.

An image region of a panorama image [$P_c$] obtained by converting the all azimuth image is converted into a rectangular image whose height corresponds to an incidence range of an incidence angle θ with respect to an all azimuth sensor coordinate axis $Z_c$ and whose lateral width corresponds to a rectangular image corresponding to a range of an azimuth angle φ.

That is, an image sensor capable of projecting incident light from all directions (θ is 0 to 180°, φ is 0 to 360°) of the spherical body is capable of producing a video on a whole panorama image region plane. However, since the body is actually a semisphere, the panorama image [$P_c$] of an upper half region corresponding to the incidence angle θ (0 to 90°) is constituted. In this case, even when the sensor takes any posture, any converted image is not produced outside the range.

Since the image is developed into a cylindrical panorama image centering on the optical axis of the all azimuth image sensor in the conventional panorama image processing, image distortion increases in the upper part of the panorama image region corresponding to the optical axis center. Accordingly, the image distortion largely changes with respect to the movement of the all azimuth image sensor depending on the image position of the characteristic point, and it is difficult to trace the image.

Therefore, in the present embodiment, a panorama image plane in which rotary movement is fixed to the world coordinate is mounted, and in the world coordinate, a display position of the projected image does not change, even when the rotation posture of the all azimuth image sensor changes. Relations among the panorama images are shown in FIGS. 8D to 8F.

First, a cylindrical peripheral image plane is defined in a gravity azimuth coordinate system {P} parallel to a gravity axis. FIG. 8F shows a gravity correction panorama image [$P_p$] obtained by converting the panorama image with respect to the cylindrical panorama image plane on the basis of the gravity azimuth coordinate system {P} ($X_p$-$Y_p$-$Z_p$).

That is, in the coordinate system {P} of the gravity-corrected cylindrical panorama image [$P_p$], as shown in FIG. 8D, a central axis $Z_p$ is constantly directed in a zenith direction, and another coordinate axis also coincides with the world coordinate system {W}. That is, each coordinate axis of the coordinate system {P} in the coordinate system in FIG. 8D constitutes a coordinate axis which does not rotate and which is displaced only in a translational direction.

It is to be noted that in the gravity correction process in this case, gravity vector information by the acceleration sensor 20 of the self-sustaining movement detection section 2, and rotation information of the angular velocity sensor 10 are utilized as information at a panorama conversion time.

Here, a $Z_w$ axis of the world coordinate system {W} is a coordinate axis which coincides with a gravity vector of the earth. Therefore, the $Z_p$ axis of the panorama coordinate system {P} similarly coincides with the gravity vector. It is to be noted that $X_p$, $Y_p$ axes are axes indicating azimuth directions at a time when the spatial posture sensor is initialized.

Therefore, in the initialization, the panorama coordinate system {P} completely coincides with the world coordinate system {W}. On the other hand, at least the rotation center position $O_c$ only of the all azimuth panorama coordinate system {C} of the all azimuth image sensor coincides with a center position of the world coordinate system {W}, but the other coordinate systems do not necessarily coincide with the world coordinate system {W}.

Moreover, the camera sensor frame {C} of the all azimuth image sensor is displaced with a degree of freedom of spatial six axes with respect to the world coordinate system {W} together with the movement of the spatial posture sensor, and the panorama coordinate system {P} constitutes a coordinate system which is only displaced with a degree of freedom of translational three axes with respect to the world coordinate system {W} and to which rotation three axes are fixed.

That is, incident light rays upon the all azimuth panorama coordinate system {C} from optional points $\delta_w(x, y, z)$ in the world coordinate space strike on a $Q_c$ point of the all azimuth image sensor at an incidence angle $(\theta_c, \phi_c)$. However, when the same point $\delta_w(x, y, z)$ is viewed from the all azimuth image sensor converted into the gravity correction panorama coordinate system {P}, the light ray strikes on a $Q_p$ point at an incidence angle $(\theta_p, \phi_p)$. It is to be noted that positions of the Q points on the images in the respective coordinate systems are shown by small circles in the figures.

In the conversion into the panorama image in the conventional all azimuth image, the image has been developed into the panorama image [$P_c$] as shown in FIG. 8C on the basis of the center position of the circle of the all azimuth image corresponding to an intersection of the $Z_c$ axis which is an optical axis center on the spherical plane, that is, an intersection of broken lines shown in FIG. 8B. However, in the gravity correction system, an intersection of the $Z_p$ axis which is the gravity vector with the spherical surface, that is, an intersection of broken lines shown in FIG. 8E, and the all azimuth image is developed into the panorama image centering on the intersection to produce the gravity-corrected panorama image [$P_p$] shown in FIG. 8F. Here, FIG. 8E shows an imaginary image, and does not show any actually acquired image.

Next, an image $(u_c, v_c)$ of the camera coordinate system, corresponding to a virtual pixel $(u_p, v_p)$ of the gravity correction all azimuth coordinate system, at this time is obtained.

It is to be noted that here an example of the optical system of the all azimuth image sensor constituted for equi-solid-angle projection conversion is described, but a basic idea is the same also in an equidistance projection system or another optical system.

First, the following relational equation is derived from the actually acquired all azimuth image.

$$u_c = \sin\frac{\theta_c}{2}\cos\phi_c \quad \Leftrightarrow \quad \begin{cases} x_c = d_c\sin\theta_c\cos\phi_c \\ y_c = d_c\sin\theta_c\sin\phi_c \\ z_c = d_c\cos\theta_c \end{cases} \quad \text{(Equation 1)}$$
$$v_c = \sin\frac{\theta_c}{2}\sin\phi_c$$

It is to be noted that a left equation of (Equation 1) represents image representation in a camera image, and a right equation represents a three-dimensional coordinate value in the camera coordinate system. Moreover, $d_c$ denotes an unknown distance from $O_c$ to $\delta_c(x_c, y_c, z_c)$. Furthermore, (Equation 2) is derived from the opposite equations of (Equation 1).

$$\begin{cases} \phi_c = \tan^{-1}\dfrac{y_c}{x_c} \\ \theta_c = \tan^{-1}\dfrac{\frac{x_c}{\cos\phi_c}}{z_c} \end{cases} \quad \text{(Equation 2)}$$

Similarly, the following relational equation is derived from the gravity-corrected all azimuth image.

$$u_p = \sin\frac{\theta_p}{2}\cos\phi_p \quad \Leftrightarrow \quad \begin{cases} x_p = d_p\sin\theta_p\cos\phi_p \\ y_p = d_p\sin\theta_p\sin\phi_p \\ z_p = d_p\cos\theta_p \end{cases} \quad \text{(Equation 3)}$$
$$v_p = \sin\frac{\theta_p}{2}\sin\phi_p$$

It is to be noted that the left equation of (Equation 3) indicates image representation given at a time of rotation of the image as if the image were viewed in the direction of the gravity vector with the same camera, and the right equation indicates a three-dimensional coordinate value in the coordinate system of the gravity correction all azimuth image. Moreover, $d_p$ denotes an unknown distance from $O_p$ to $\delta_p(x_p, y_p, z_p)$.

Here, since an origin $O_p$ of the gravity correction panorama coordinate system {P} coincides with an origin $O_c$ of the camera coordinate system {C} of the all azimuth image sensor, a relation among three-dimensional coordinate values in the respective coordinate systems are as follows.

$$\begin{bmatrix} x_c \\ y_c \\ z_c \end{bmatrix} = {}_cR_p \begin{bmatrix} x_p \\ y_p \\ z_p \end{bmatrix} \quad \text{(Equation 4)}$$

or $$\begin{bmatrix} x_p \\ y_p \\ z_p \end{bmatrix} = {}_pR_c \begin{bmatrix} x_c \\ y_c \\ z_c \end{bmatrix}$$

Here, ${}_cR_p$ or ${}_pR_c$ of (Equation 4) is rotation posture information of the camera coordinate system {C}, and is a rotation matrix including a gravity vector, estimated from the angular velocity sensor 10 and the acceleration sensor 20.

Figure 10:
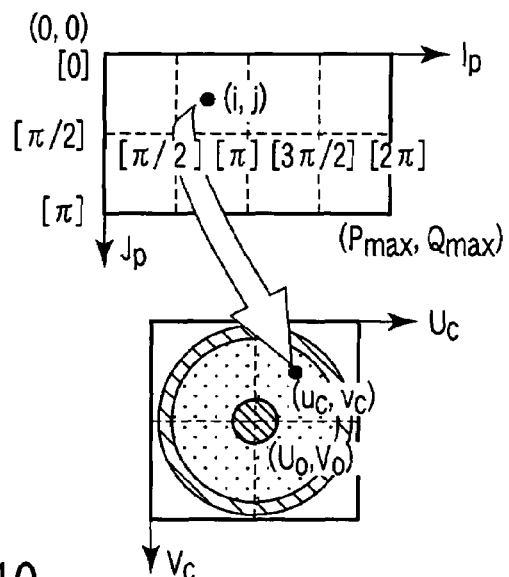
FIG. 10 is a diagram of a relation with an all azimuth image, showing conversion of a gravity correction panorama image.

Pixel information on the all azimuth image sensor image {C} corresponding to each pixel position (i, j) of the panorama image [$P_p$] actually gravity-corrected as shown in FIG. 10 is obtained from the above-described relational equation to produce a gravity correction panorama image.

A relation between an actual coordinate position ($U_c, V_c$) on the all azimuth image and a normalized image position ($u_c, v_c$) is represented by (Equation 5).

$$\begin{cases} u_c = \dfrac{U_c - U_0}{\alpha} = \sin\dfrac{\theta_c}{2}\cos\phi_c \\ v_c = \dfrac{V_c - V_0}{\alpha} = \sin\dfrac{\theta_c}{2}\sin\phi_c \end{cases} \quad \text{(Equation 5)}$$

Here, $\alpha$ is determined by a relation between a minimum value $\theta_{pmin}$ and a maximum value $\theta_{pmax}$ of the incidence angle. Moreover, ($U_0, V_0$) is an optical axis center image position of the all azimuth image. To obtain this ($\alpha, U_0, V_0$) corresponds calibration of the image.

Assuming that the image position on the gravity correction panorama image [$P_p$] ($I_p$-$J_p$) region is (i, j), a relation between light ray incidence angles $\theta_p$ and $\phi_p$ with respect to the panorama image coordinate system {P} is represented by (Equation 6).

$$\theta_p = j\frac{\pi}{Q_{max}}, \quad \phi_p = i\frac{2\pi}{P_{max}} \qquad \text{(Equation 6)}$$

$$\because 0 \leq i < 2\pi, \quad 0 \leq j < \pi$$

Here, $(P_{max}, Q_{max})$ denotes a vertical/horizontal image size of a panorama image processing region. When $\theta_p$ and $\phi_p$ are obtained in this manner, $(x_p, y_p, z_p)$ can be obtained from (Equation 3). Here, $d_p=1$ is set, and a table for obtaining $(x_p, y_p, z_p)$ from $(i, j)$ may be prepared beforehand.

Next, assuming horizontal tilt information $(\phi_x, \phi_y)$ obtained by the acceleration sensor with respect to $X_w$, $Y_w$ axes, and a rotation angle $(\phi_z)$ around a gravity axis, estimated by the angular velocity sensor, an estimated value $_cR_p$ or $_pR_c$ of rotation posture information of an inertial sensor coordinate system $\{S\}$ (the same as the camera coordinate system $\{C\}$ viewed from the world coordinate system $\{W\}$ can be obtained from $(\phi_x, \phi_y, \phi_z)$.

Therefore, $(x_c, y_c, z_c)$ is calculated from $(x_p, y_p, z_p)$ and $_cR_p$ by the relation of (Equation 4). Next, an incident light ray angle $(\phi_c, \phi_c)$ in an actual camera coordinate system is obtained from the calculated $(x_c, y_c, z_c)$ and (Equation 2).

A normalized coordinate position $(u_c, v_c)$ on the all azimuth image is further calculated from (Equation 1) described above, and an actual coordinate $(U_c, V_c)$ of the image position is obtained from these values and (Equation 5). The pixel information of the coordinate is read to thereby obtain the information of the image position $(i, j)$ of the panorama image.

The above-described operation is repeatedly performed with respect to each pixel of the panorama image to thereby produce the gravity correction panorama image.

It is to be noted that in the above-described process, any corresponding point does not exist depending on the posture of the all azimuth image sensor in the all azimuth image region corresponding to the coordinate position of the panorama image in some case. This is a case where $\theta_c$ obtained from (Equation 2) is out of an incidence field angle range. In this-time semispherical image sensor, any light ray out of a range of $0 \leq \theta_c \leq 90°$ does not enter. Then, a luminance value of the panorama image out of this range is set to 0.

Moreover, a ratio of an occupying region in the whole panorama image is 50% in the semispherical all azimuth image sensor. Therefore, when the number of processed pixels reaches 50%, the calculation is halfway stopped, all subsequent regions are set to 0, and accordingly a calculation process can be speeded up.

Furthermore, when a position or direction to start pixel scanning of the panorama image, and further a range of a position to end are adopted by the tilt of the gravity vector or the value of the azimuth angle, it is possible to speed up a conversion process.

Figure 9:
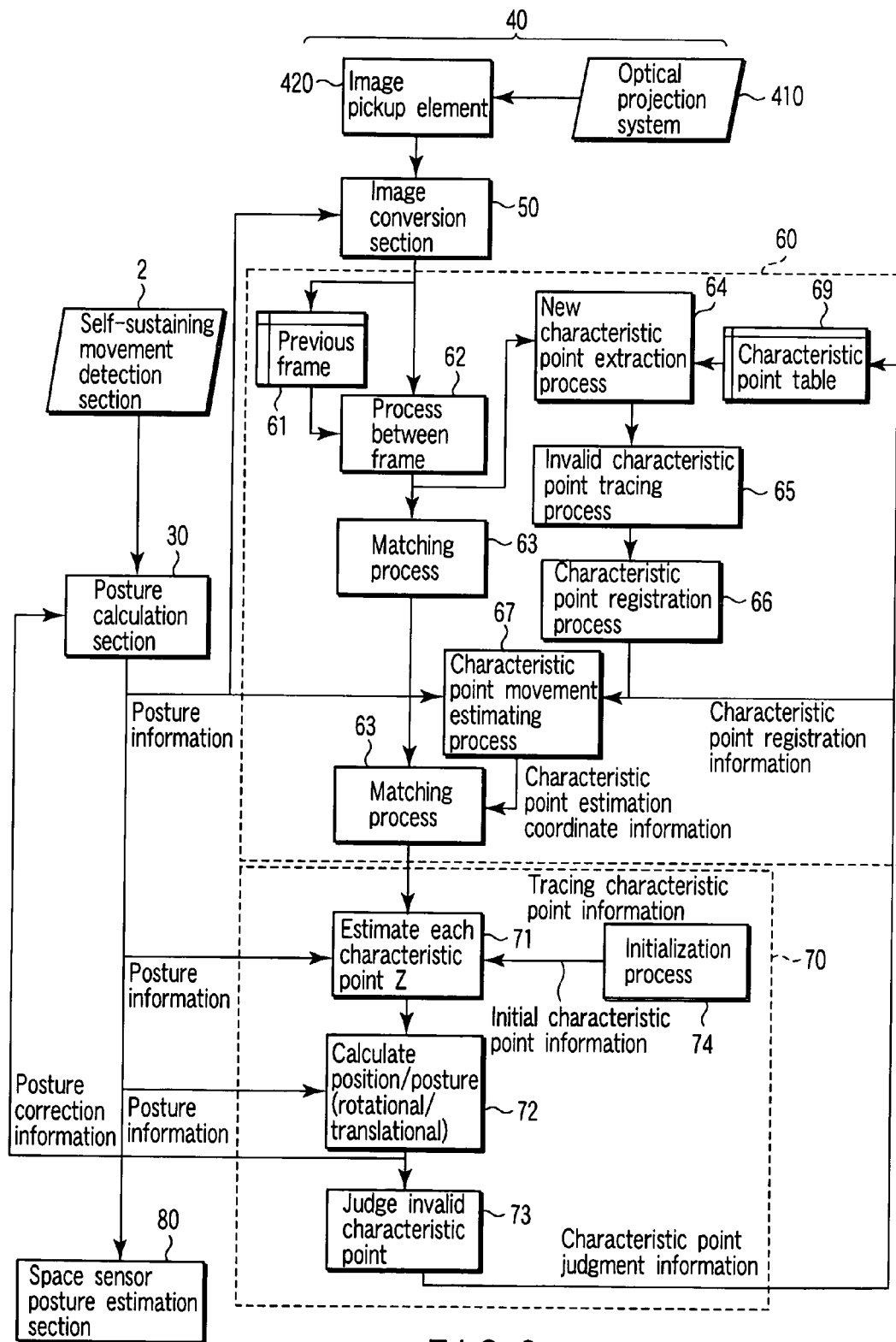
FIG. 9 is a block diagram showing a functional operation concerning image processing in the movement detection device according to the embodiment of the present invention.

FIG. 9 shows a process performed inside the image recognition section 60 and the camera posture estimation section 70 in FIG. 1 described above. A flow of the process in the image recognition section 60 and the camera posture estimation section 70 will be described with reference to the drawing.

First, all azimuth image data is acquired in the image pickup section 40 comprising an optical projection system 410 and an image pickup element 420. Next, the acquired all azimuth image device is converted into the above-described gravity correction panorama image in the image conversion section 50. Thereafter, an image converted into the gravity correction panorama image is output to the image recognition section 60.

In the image recognition section 60, characteristic point processing such as extracting or searching of the characteristic point from a continuous frame image is performed in order to relative movement of the peripheral image.

First, a new characteristic point extraction process 64 is performed in order to obtain the characteristic point from frame image data converted into the gravity correction panorama image. Here, first an edge of an input image around a predetermined coordinate position is detected in order to search an image constituting the characteristic point. Thereafter, the detected edge is evaluated to thereby search the characteristic point. For the evaluation, the panorama image region is divided into optional rectangular regions to constitute a search region, and a characteristic point initial searching region is defined. The vicinity of the central position in the defined region is a coordinate position to start the searching of the characteristic point.

It is to be noted that a reason why the coordinate position to start the searching is set to the vicinity of the defined region is that data from many directions scattered with respect to the spatial posture sensor 1 is usable as characteristic point information. Movements of the characteristic points from front/back/right/left peripheral directions of the spatial posture sensor 1 are compared, and accordingly the movement of the spatial posture sensor 1 itself in the space can be correctly estimated.

Moreover, as a method of detecting the edge of the input image, here, the edge is detected by a differential operator (e.g., Sobel operator) of X and Y directions, and accordingly a place wherein the edge exists is searched in both the XY directions. This is performed in order to reduce errors in the subsequent matching process 63 of the characteristic point images.

As a result of the new characteristic point extraction process 64, when the characteristic point is extracted, a characteristic point registration process 66 is performed. In the characteristic point registration process 66, as new characteristic point information, a characteristic point registration coordinate $(u_k, v_k)$, a characteristic point image of a certain rectangular region in which the characteristic point is set as a center position, and the space sensor frame $\{H\}$ which is the posture information with respect to the world coordinate system $\{W\}$ already obtained at this registration time are registered, and further the information is also set into a registered flag.

It is to be noted that in the characteristic point registration process 66, a process of registration the above-described characteristic point information is performed with respect to all the characteristic points extracted in the vicinity of an initial search position.

At the time of first system initialization, the process of the image recognition section 60 is ended here. Moreover, in a process of a second frame input next, these characteristic point information is utilized as the previous information in the matching process 63.

A process of detecting the edge is performed in the same manner as in the above-described process also in the image processing of the second and subsequent frames. At this time, the registered flag of the registered characteristic point information is checked. It is to be noted that this process is shown in "process between frames 62" in the drawing.

As a result of the checking of the registered flag, when the registered characteristic point exists, a most correlated portion with the registered image is searched in the in the vicinity of the characteristic point registration coordinate ($u_k$, $v_k$) in the present frame image. Here, when a correct position, that is, a highly correlated portion is found, the portion is stored as the present characteristic point coordinate, and information of the characteristic point search flag is set. On the other hand, when the highly correlated portion is not found, the registered flag and the characteristic point search flag of the registered information are reset.

In this process, the matching process 63 is performed while the characteristic point image is scanned in a certain range with respect to the characteristic point registration position. In the matching process 63, a place having a highest correlation value is detected as a matching coordinate (U', V'). Furthermore, it is judged whether or not the correlation value exceeds a certain reference value, and it is judged that the searching has been correctly performed in a case where the correlation value exceeds the certain reference value.

Moreover, in the detection of the matching position in the matching process 63, the position having the highest correlation value is detected while moving/scanning characteristic point image data little by little with respect to an input frame image. This is performed by superimposing the characteristic point image data which is a set of pixel information upon the input frame image to search a place where a value at a time when absolute values of differences between the respective pixels are integrated for all pixels. Therefore, in a conventional correlation process, it has been necessary to subject the characteristic point coordinate ($u_k$, $u_k$) which is a start address to an address operation for parallel movement having a size of a search region, and a rotating operation by affine conversion. Therefore, a combined operation of parallel movement and rotating movement has to be performed for searching one characteristic point image, and very many calculation processes have been required. Furthermore, this process has to be performed with respect to all the registered characteristic points, and a very great calculation process cost has been required.

Therefore, in the present embodiment, gravity correction panorama image data is utilized as a frame image. When the gravity correction panorama image data is prepared, as described above, the rotation is corrected in such a manner that the vertical direction of the image is constantly directed in a gravity vector axial direction, and a right/left direction of the image is constantly directed in a horizontal rotation direction, and the image is converted.

Therefore, when the image conversion of the gravity correction is correctly performed, and further the spatial posture sensor 1 performs rotating movement only, the characteristic point image is constantly fixed to the same position. Moreover, an only display range of the projected image in the panorama image region changes with respect to the rotating movement at this time.

Therefore, when a template matching process is performed, the rotating operation by the affine conversion of the image does not have to be added, further a template image does not have to be largely scanned with respect to the movement involving the rotating movement of the spatial posture sensor 1, and loads of the matching process can be reduced very much.

It is to be noted that since a sensor signal of the self-sustaining movement detection section 2 is utilized in actual panorama image conversion, an amount of an estimated error of the posture information, and displacement of the position of the characteristic point by the translational movement of the spatial posture sensor 1 appear. However, even in this case, the rotating operation of the image is not required, and a very simple matching process of the only operation of translational movement may be performed.

Moreover, when translational movement information estimated by the acceleration sensor 20 is used, a movement image position of the characteristic point is estimated, and the vicinity of the estimated position is scanned, the matching process can be speeded up.

Therefore, considering correspondence to the space sensor frame, when a position/posture $\{_0H_n\}$ of a space sensor frame n updated at this time (this means coordinate conversion into the present sensor frame as viewed from the world coordinate system) is calculated, the estimation is performed utilizing inversion of $\{_0H_k\}$ which is a sensor frame k at a time when each characteristic point is registered, and a relative movement parameter $\{_kH_n\}$ indicating coordinate conversion from when each characteristic point is registered until the present space sensor frame n, or $\{_nH_k\}$ which is inversion of the parameter. Mathematically, for example, assuming that a coordinate value ($x_k$, $y_k$, $z_k$) in the sensor frame k corresponds to a coordinate value ($x_n$, $y_n$, $z_n$) in the sensor frame n, the position/posture is represented by coordinate conversion as follows:

$$\begin{bmatrix} x_n \\ y_n \\ z_n \\ 1 \end{bmatrix} = {_nH_k} \begin{bmatrix} x_k \\ y_k \\ z_k \\ 1 \end{bmatrix} = \begin{bmatrix} {_nR_k} & {_nT_k} \\ 0 & 1 \end{bmatrix} \begin{bmatrix} x_k \\ y_k \\ z_k \\ 1 \end{bmatrix} \quad \text{(Equation 7)}$$

or $$\begin{bmatrix} x_n \\ y_n \\ z_n \end{bmatrix} = {_nR_k} \begin{bmatrix} x_k \\ y_k \\ z_k \end{bmatrix} + {_nT_k} = \begin{bmatrix} r_{11} & r_{12} & r_{13} \\ r_{21} & r_{22} & r_{23} \\ r_{31} & r_{32} & r_{33} \end{bmatrix} \begin{bmatrix} x_k \\ y_k \\ z_k \end{bmatrix} + \begin{bmatrix} t_x \\ t_y \\ t_z \end{bmatrix} \quad \text{(Equation 8)}$$

where $_nR_k$ is a rotation matrix, and represents a 3×3 matrix in which $r_{ij}$ (i=1, 2, 3, j=1, 2, 3) is an element. This matrix can be represented by three independent parameters ($\phi_x$, $\phi_y$, $\phi_z$). On the other hand, $_nT_k$ represents a translational vector, and can be represented by three independent parameters ($t_x$, $t_y$, $t_z$). That is, a position/posture relation between the respective frames can be represented by six parameters in total, for example, ($\phi_x$, $\phi_y$, $\phi_z$, $t_x$, $t_y$, $t_z$).

That is, while a relational equation of $_0H_n = {_0H_{kk}H_n}$, or $_nH_0 = {_nH_{kk}H_0}$ is utilized, the position/posture relation in the world coordinate system of the sensor frame n at this time is estimated.

Next, when ($\phi_x$, $\phi_y$, $\phi_z$) in this movement parameter is approximately set to 0, the coordinate position of the characteristic point registration coordinate ($u_k$, $v_k$) in the panorama image in the present frame image is estimated.

When the vicinity of the obtained characteristic point movement estimation coordinate ($u_{prev}$, $v_{prev}$) obtained by this characteristic point movement estimating process 67 is searched, a searching region can be narrowed, and a calculation process cost can be reduced.

As another system of acquiring movement information from the gravity vector panorama image data, a system by an optical flow can be performed.

In this system, a matching process is performed in which sampling points are defined at certain intervals on the whole image plane, image information around this sampling point is recorded for each frame image, and this recorded image is used as a template in the next frame image. At this time, if the matching is correctly performed, a movement vector of the image for each sampling point is searched. When this process is performed with respect to simply continuous frame images, the movement vector between the respective frame images can be acquired.

Even when this process is used, and when the template matching is performed in the same manner as in the above-described process, the rotating operation by the affine conversion of the image does not have to be added. Translational movement information estimated by the acceleration sensor 20 is used, a movement image position of a sampling image is estimated, the vicinity of the estimated position is scanned, and accordingly the matching process can be speeded up. It is possible to repeat a simple operation at a high speed in the process, and an extraction process of the movement vector from the image can be performed at a higher speed.

The present camera posture information $\{_nC_0\}$ is obtained by the characteristic point information obtained up to this process in the camera posture estimation section 70. Here, assuming that the movement of the world coordinate system centering on the camera coordinate system is traced, formulation is performed in the camera posture estimation section 70. Once the position/posture $\{_nH_0\}$ of the world coordinate system with respect to the camera coordinate system is calculated, the position/posture $\{_0H_n\}$ of the camera coordinate system (i.e., space sensor system) with respect to the world coordinate system can be easily obtained as the inverse matrix (inversion).

Here, the camera sensor frame is constructed on the spatial posture sensor 1 which is a space sensor frame as shown in FIG. 3, and therefore when the space sensor frame $\{H\}$ is subjected to a certain conversion matrix $\{_cR_H\}$, the frame can be constantly converted into the camera sensor frame $\{C\}$. It is to be noted that, here, to simplify the description, the embodiment will be described assuming that the camera sensor frame $\{C\}$ matches the space sensor frame $\{H\}$.

Here, in the following description, it is assumed that n is a number of a frame to be obtained, 0 denotes a first frame, and k denotes a frame number at a time when the characteristic point is registered.

This will be described later in detail, and initialization process 74 is performed in a first frame 0. The space sensor frame at this time is n=0. That is, this is a state in which $\{_0H_0\}$ matches $\{_0H_w\}$, that is, the space sensor frame $\{H\}$ matches the world coordinate space $\{W\}$. Further in the initialization process 74, a characteristic point in which depth information z is known is registered as the characteristic point obtained from the image pickup section 40. Here, this depth information z indicates depth information with respect to a sensor frame system. It is to be noted that this initialization process 74 will be further described later. It is assumed that $\{_nC_0\}$ is equivalent to $\{_nH_0\}$ in the following description.

Figure 11:
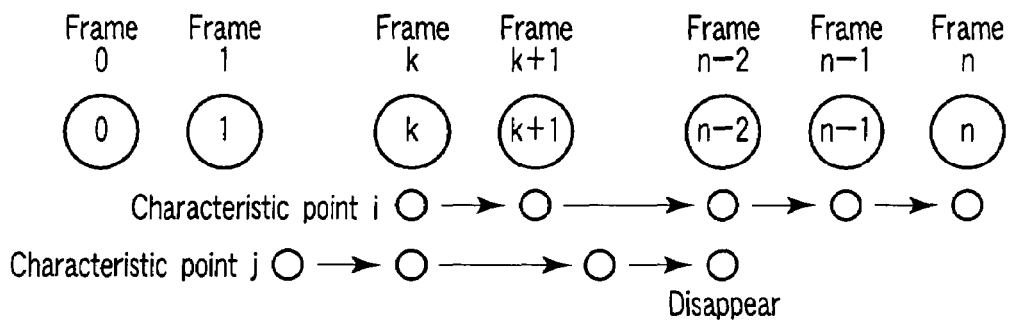
FIG. 11 is an image diagram concerning behaviors of characteristic points on continuous frame images.

Images from when the characteristic points appear in a plurality of picture image streams until they disappear are shown in FIG. 11. In FIG. 11, a characteristic point i first appears in a frame k, and a characteristic point j disappears in a frame (n−2). The above-described matching process 63 and characteristic point registration process 66 are performed for each of these frame images.

Figure 12:
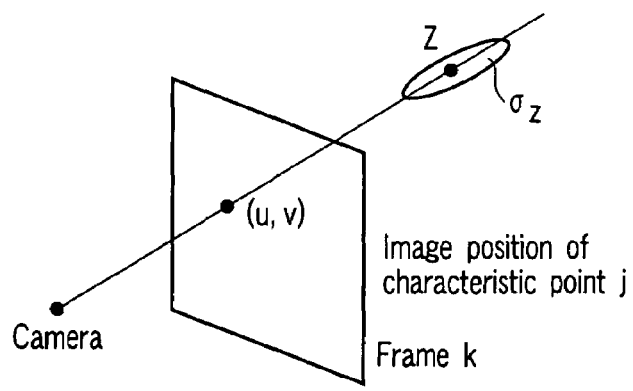
FIG. 12 is an image diagram concerning an image position, depth information, and uncertain element of a camera frame of a characteristic point image obtained by an image sensor.

From a time when the characteristic point is first registered, characteristic point coordinate (u, v) and depth information z are used as associated parameters of this characteristic point. A maximum value is assigned to an uncertain element $\sigma_z$ with respect to the depth information z. It is to be noted that images of this characteristic point coordinate (u, v) and the depth information z are shown in FIG. 12. In this figure, an elliptic shape around a point z is the uncertain element $\sigma_z$.

Figure 13:
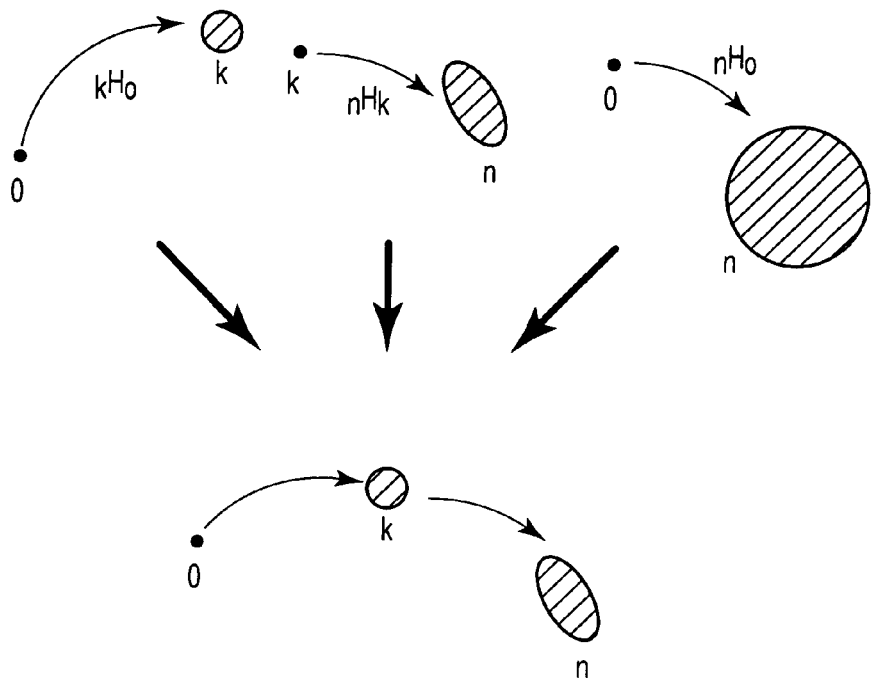
FIG. 13 is an image diagram showing a state in which errors of posture information and depth information related to characteristic point information gradually decrease by repetition of a matching process of the characteristic points.
Figure 14:
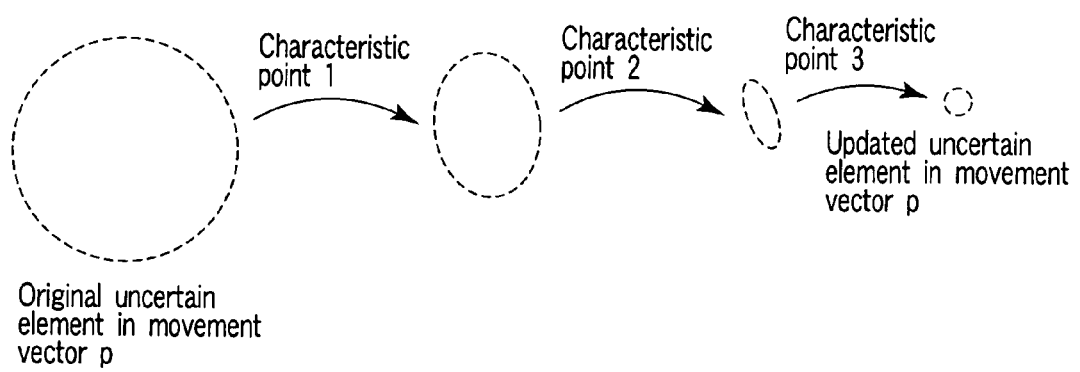
FIG. 14 is an image diagram showing a state in which uncertain elements of a movement vector gradually decrease.

When the characteristic points are correctly matched in a new frame image, the present space sensor frame $\{_nH_0\}$ is updated utilizing estimated values of rotational and translational information from a camera frame $\{_kC_0\}$ (this is equivalent to $\{_kH_0\}$) at a time when this characteristic point is first registered. The frame k is converted into a frame n, that is, $\{_nH_k\}$:p=$(^n\phi_x^k, ^n\phi_y^k, ^n\phi_z^k, ^nt_x^k, ^nt_y^k, ^nt_z^k)$, and the associated uncertain element $\sigma_z$ are first updated. Subsequently, the frame 0 is converted into the frame n, and the associated uncertain element $\sigma_z$ is updated using a relation equation $_nH_0 = {_nH_{kk}H_0}$ among the frames 0, k, and n. FIGS. 13 and 14 show image diagrams of this state. It is to be noted that p indicates a movement vector. Moreover, $\{_kH_0\}$ is a known value converted/updated up to this process.

Next, the uncertain element $\sigma_z$ associated with $\{_nH_0\}$ is updated in order, and the depth information z of the characteristic point image is also updated. To perform this, first $\{_nH_k\}$ for a characteristic point image i obtained by calculating $\{_nH_k\} = {_nH_{00}H_k}$ is recalculated, and depth information z is updated on the basis of (u, v) and (u', v') which indicate correspondence of the frames k and n.

This newly obtained z is also used in estimating the next frame conversion. It is to be noted that contents of each characteristic point information are represented as follows.

1) Frame number k at a time when the characteristic point first appears and is registered 2) Standardized characteristic point coordinate (u, v) in the frame k 3) Depth information z (shape vector constituting element associated with (u, v)) defined in the frame k 4) $\{_kH_0\} \equiv {_kH_0}(_kR_0, _kT_0) \equiv {_kH_0}(^k\phi_x^0, ^k\phi_y^0, ^k\phi_z^0, ^kt_x^0, ^kt_y^0, ^kt_z^0)$ (movement parameter) (already calculated in the frame at the registration time)

5) Previous space sensor frame $\{_{n-1}H_0\}$ (already calculated in the previous frame (n−1))

6) Standardized characteristic point coordinate $(u_{prev}, v_{prev})$ in the previous frame (n−1)

7) Covariance matrix cov $(u_{prev}, v_{prev})$ in the previous frame (n−1)

Figure 15:
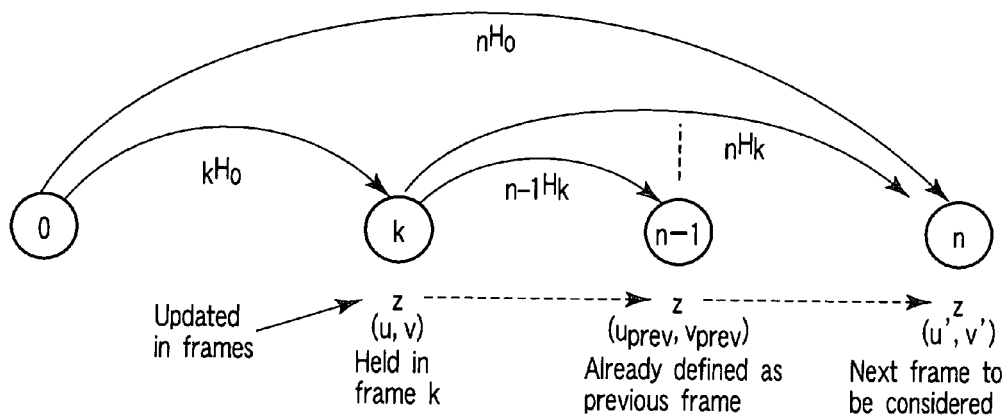
FIG. 15 is a relation diagram among spatial posture information k at a registration time of a certain characteristic point, previous posture information (n−1), and posture information constitution to be obtained next.

In a new frame image, the respective characteristic points are used as markers, and the above-described parameters are associated with the respective characteristic points. Here, relations among the frames are shown in FIG. 15.

Next, the following process is performed in order to obtain the above-described depth information z, $\{_nH_k\}$, and the other values. It is to be noted that it is assumed at this time that the movement parameters till the previous frame have been evaluated. Furthermore, it is assumed that $\{_kH_0\}$ and $\{_{n-1}H_k\}$ have been evaluated by the average value and covariance matrix. At this time, $_nH_{n-1n-1}$ $(^n\phi_x^{n-1}, ^n\phi_y^{n-1}, ^n\phi_z^{n-1}, ^nt_x^{n-1}, ^nt_y^{n-1}, ^nt_z^{n-1})$ is estimated considering the uncertain element. Accordingly, an estimated value $\{_nH_{n-1n-1}\}$ is given. From this $\{_nH_{n-1n-1}\}$, $\{_nH_0\}$ is estimated.

Next, the matching of the characteristic point already registered in a characteristic point list in the frame (n−1).

First, $_nH_k$ $(^n\phi_x^k, ^n\phi_y^k, ^n\phi_z^k, ^nt_x^k, ^nt_y^k, ^nt_z^k)$ is predicted as follows.

$$\{_nH_k\} = {_nH_{n-1n-1}} {_{n-1}H_k}, r_{ij} \in \{_nH_k\} \quad \text{(Equation 9)}$$

Moreover, to update $\{_nH_k\}$, the following restriction is held.

$$u' = \frac{z(r_{11}u + r_{12}v + r_{13}) + ^nt_x^k}{z(r_{31}u + r_{32}v + r_{33}) + ^nt_z^k} \quad \text{(Equation 10)}$$

-continued $$v' = \frac{z(r_{21}u + r_{22}v + r_{23}) + {}^n t_y^k}{z(r_{31}u + r_{32}v + r_{33}) + {}^n t_z^k}$$

where (u', v') is a measurement in the frame n, and has a small measurement uncertain element concerning the average value and covariance matrix.

Moreover, after the initial calculated value of the movement vector $p=({}^n\phi_x^k, {}^n\phi_y^k, {}^n\phi_z^k, {}^n t_x^k, {}^n t_y^k, {}^n t_z^k)$ the characteristic point coordinate (u', v'), and the depth information z are obtained, the movement vector $p=({}^n\phi_x^k, {}^n\phi_y^k, {}^n\phi_z^k, {}^n t_x^k, {}^n t_y^k, {}^n t_z^k)$ and the depth information z are updated using Kalman filter. Here, $\overline{p}=({}^n\overline{\phi}_x^k, {}^n\overline{\phi}_y^k, {}^n\overline{\phi}_x^k, {}^n\overline{t}_x^k, {}^n\overline{t}_y^k, {}^n\overline{t}_z^k$ and $\overline{z}$ are updated average value and covariance. Accordingly, $\{{}_nH_k\}$ is updated.

Next, $\{{}_nH_0\}$ is updated. When the updated $\{{}_nH_k\}$ is obtained in these processes, $\{{}_nH_0\}$ is updated using the Kalman filter is used again.

Furthermore, ${}_0H_n={}_nH_{kk}H_0$ is considered in measuring $\{{}_nH_k\}$ and $\{{}_kH_0\}$, and in the parameter $\{{}_nH_0\}$ calculated by the Kalman filter. Here, in the following equations:

$a=({}^n\phi_x^k, {}^n\phi_y^k, {}^n\phi_z^k, {}^n t_x^k, {}^n t_y^k, {}^n t_z^k)$ $b=({}^k\phi_x^0, {}^k\phi_y^0, {}^k\phi_z^0, {}^k t_x^0, {}^k t_y^0, {}^k t_z^0)$ $p=({}^n\phi_x^0, {}^n\phi_y^0, {}^n\phi_z^0, {}^n t_x^0, {}^n t_y^0, {}^n t_z^0)$ (Equation 11)

cov(a) and cov(b) at this time have very small values. It is to be noted that a, b, p of (Equation 11) all indicate vector amounts. Furthermore, the following equation is held as a three-dimensional equation:

$f(p, a, b) = 0$ (Equation 12).

Figure 16:
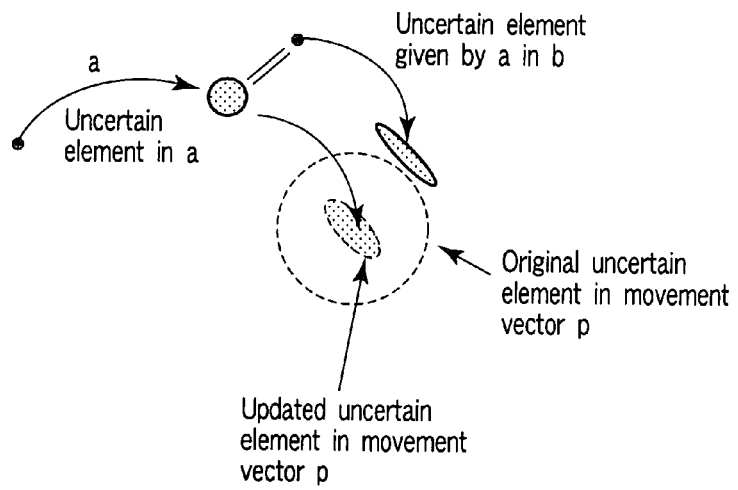
FIG. 16 is a diagram showing a relation among uncertain elements of the movement vector.

To update this p, the Kalman filter is used. The state after the update is shown in FIG. 16. It is to be noted that in FIG. 16, k indicates a frame number at which the characteristic point first appears in the image, and (u', v') is a coordinate of the characteristic point position in the frame n. Moreover, cov (u', v') is a covariance matrix in the frame n.

That is, $p=({}^n\phi_x^0, {}^n\phi_y^0, {}^n\phi_z^0, {}^n t_x^0, {}^n t_y^0, {}^n t_z^0)\in\{{}_nH_0\}$ can be updated using the respective characteristic points and the Kalman filter.

Moreover, the uncertain elements of p can be very largely reduced in a case where the Kalman filter can be applied to the movement vector p in order.

Next, the depth information z defined in the frame k is estimated. Thereafter, the Kalman filter is applied to the movement vector p only in order. Moreover, after updating p, the Kalman filter is applied again. Accordingly, the uncertain element $\sigma_z$ of z can be reduced. This is performed by the following method.

After $p=({}^n\phi_x^0, {}^n\phi_y^0, {}^n\phi_z^0, {}^n t_x^0, {}^n t_y^0, {}^n t_z^0)\in\{{}_nH_0\}$, expression of $\{{}_nH_k\}$ is formulated again using the following (Equation 13).

$\{{}_nH_k\} = {}_nH_{00}H_k = {}_nH_0 ({}_kH_0)^{-1}$ (Equation 13)

First, the uncertain element is propagated using the following equation.

$$\text{Measurement} \begin{cases} ({}^n\phi_x^0, {}^n\phi_y^0, {}^n\phi_z^0, {}^n t_x^0, {}^n t_y^0, {}^n t_z^0) \in \{{}_nH_0\} \\ ({}^k\phi_x^0, {}^k\phi_y^0, {}^k\phi_z^0, {}^k t_x^0, {}^k t_y^0, {}^k t_z^0) \in \{{}_kH_0\} \end{cases}$$

Both of them have to carry very small uncertain elements corresponding to $\{{}_nH_k\}$ by individual characteristic points. Then, the above-described (Equation 13) is considered.

Then, evaluated values of $c=({}^n\phi_x^k, {}^n\phi_y^k, {}^n\phi_z^k, {}^n t_x^k, {}^n t_y^k, {}^n t_z^k)\in\{{}_nH_k\}$ and covariance are obtained.

Here, (u', v') having a frame k adapted to the depth information z of the frame n is defined by (Equation 10) described above.

Here, (u', v') and $c=({}^n\phi_x^k, {}^n\phi_y^k, {}^n\phi_z^k, {}^n t_x^k, {}^n t_y^k, {}^n t_z^k)\in\{{}_nH_k\}$ are non-correlated with all measurements (or already evaluated values). It is to be noted that the depth information z is, needless to say, calculated.

After calculating all the values in the frame n, $c=({}^n\phi_x^k, {}^n\phi_y^k, {}^n\phi_z^k, {}^n t_x^k, {}^n t_y^k, {}^n t_z^k)\in\{{}_nH_k\}$ or the depth information z, and the other values are updated.

As described above, when the position/posture relation $\{{}_nH_0\}$ of the first frame 0 on the basis of the frame n indicating the present state is estimated (updated), the position/posture $\{{}_0H_n\}$ of the present frame on the basis of the world coordinate system is calculated as the inverse matrix (inversion). That is, ${}_0H_n = \{{}_nH_0\}^{-1}$.

When the position/posture $\{{}_nH_0\}$ (i.e., $\{{}_nC_0\}$) of the world coordinate system with respect to the camera coordinate system is calculated in this manner, the position/posture $\{{}_0H_n\}$ of the camera coordinate system (i.e., space sensor system) with respect to the world coordinate system can be easily obtained as the inverse matrix (inversion).

The process using six unknown numerals in the movement vector p has been described here in the camera posture estimation section 70, but in the present embodiment, the rotation parameter $(\phi_x, \phi_y)$ corresponding to the gravity vector can be solved as known. The rotational parameter $(\phi_z)$ around the gravity axis and the translational parameter $(t_x, t_y, t_z)$ have a certain degree of errors, but can be given as parameters by which an estimated range is narrowed.

It is to be noted that these parameters are obtained as results of processing of the information input from the self-sustaining movement detection section 2 in the posture calculation section 30. The movement vector p estimated in the camera posture estimation section 70 is returned to the posture calculation section 30 again. Thereafter, in the posture calculation section 30, the rotational parameter $(\phi_z)$ around the gravity axis and the translational parameter $(t_x, t_y, t_z)$ are corrected.

That is, the information input into the posture calculation section 30 from the self-sustaining movement detection section 2 is an error amount from a value corrected based on the information returned from the camera posture estimation section 70. Since the error of the inertial sensor by the drift or noise is usually very small in an extent of a calculation time by the image processing, the information is close to a true value.

Finally in the space sensor posture estimation section 80, the posture information of the posture calculation section 30 is converted into position/posture information with respect to the world coordinate space $\{W\}$.

It is to be noted that in the posture calculation section 30, the processing of the posture information from the self-sustaining movement detection section 2 and the correction process by the information of the camera posture estimation section are not simultaneously or alternately performed in order, and are performed asynchronously.

Since the information is input into the posture calculation section 30 from the self-sustaining movement detection section 2 at a speed higher than that of the process in the camera posture estimation section 70, the number of times of processing of the information input from the self-sustaining movement detection section 2 is large, and update information also increases.

Therefore, the information processed based on the information input from the self-sustaining movement detection section 2 is utilized as main information in the posture information obtained in the space sensor posture estimation section 80. This posture information is updated by the information corrected at an update interval in an image processing time.

As described above, information having high response and resolution is obtained from the posture information of the self-sustaining movement detection section 2, but the errors by the drift or noise are accumulated. Then, the information is periodically corrected by the image sensor, the reference precision is maintained. Accordingly, it is possible to construct the spatial posture sensor 1 in which advantages of each sensor, such as response, resolution, and precision are utilized by sensor fusion.

Further in the present embodiment, a modification of the method of extracting the characteristic point from the above-described panorama image will be described. A flow of analysis of the gravity correction panorama image $[P_p]$ in this modification will be briefly described with reference to FIGS. 17A and 17B.

In the above-described new characteristic point extraction process 64, a characteristic position (edge) is detected by an XY differential process in the panorama image, and the peripheral image is used as the characteristic point image. On the other hand, in this modification, in gravity-corrected panorama image data, a vertical component of the image is extracted, and a line segment is utilized as the characteristic point.

First, as a process of extracting a vertical line, the panorama image data is subjected to Sobel differential process in a horizontal direction to extract a signal component of a vertical direction ($J_p$ direction of FIG. 17A). Next, the horizontal differential process images are added up in the vertical direction, and a primary histogram is prepared. Next, an image of a position in which the image changes to darkness from brightness and to brightness from darkness is extracted from this primary histogram. In a threshold process of a luminance level at this time, a characteristic image position in the vertical direction is extracted, and further the position is registered as vertical lines $V_1$ to $V_5$ of FIG. 17A (hereinafter referred to as the vertical characteristic lines). Moreover, while the process of extracting the characteristic line is next repeated in the same manner as in the above-described new characteristic point extraction process 64, the same vertical characteristic line is traced.

It is to be noted that the presently obtained posture information is also associated and recorded in the registered characteristic line information. Further in the calculation process of the camera posture, in the same manner as in the above-described example, the present posture is calculated and estimated using the Kalman filter or the like from the vertical characteristic line being traced, and the posture information at the registration time.

Additionally, in the Kalman filter process in the above-described camera posture estimation section 70, $(\phi_x, \phi_y, \phi_z)$ is approximately set to 0 in the initial value of the obtained movement parameter $(\phi_x, \phi_y, \phi_z, t_x, t_y, t_z)$, and accordingly convergence of the process can be hastened. Additionally, in this modification, it is further possible to add restricting condition of $t_z=0$. Accordingly, the process can be further speeded up.

Here, the movement of the space sensor frame {H} (i.e., the camera sensor frame {C}) viewed from a $Z_w$ axis direction on the world coordinate system {W} at this time, and images of the vertical characteristic lines $V_1$ to $V_5$ of an object in a three-dimensional space are shown in FIG. 17B. Here, slant lines around the characteristic point indicate values of the uncertain elements. It has been found that when the space sensor frame {H} moves in this manner, correctness of the depth information z of each characteristic point increases, and the uncertain element $\sigma_z$ is reduced.

Moreover, since the vertical characteristic lines $V_1$ to $V_5$ can be approximately represented by points when viewed from the $Z_w$ axis, the movement of the spatial posture sensor 1 can be estimated by obtaining the movement parameter in a two-dimensional plane (Xw-Yw).

It is to be noted that there is a high probability that the vertical characteristic line detected from the gravity correction panorama image is an object parallel to the gravity axis. It is supposed that there is a high probability that the object constituting the vertical line parallel to the gravity axis exists anywhere whether an artificial object or a natural object. Therefore, it is possible to constantly find several characteristic vertical lines from peripheral environment images of the all azimuth image sensor. When the vertical characteristic lines are traced, the camera posture (especially horizontal-direction translational and rotational movements) can be efficiently estimated.

Here, the vicinity of the intersection (south/north polar point) between the gravity vector axises of the all azimuth image in which the panorama image is developed constitutes an image in the vicinity of an upper or lower side of the panorama image, and is converted with a large distortion. However, there are many images of a ceiling, sky, ground and the like as environment images in this vicinity, and there is a low probability that an object which is also important information exists.

It is to be noted that to extract the vertical characteristic line, there is a method in which the above-described gravity correction panorama image is obtained by horizontal differentiation and vertical primary histogram process, or discontinuous lines in the vertical direction and the like are connected (edge repair process), and accordingly the lines can be easily recognized at a high speed. In these methods, an object image which is characteristic information accompanying visual point movement has less deformation or positional shift, and more correct and robust tracing is possible as compared with a method in which the natural characteristic point in the two-dimensional position is found from the peripheral environment image and traced.

Moreover, there is a high possibility that upper/lower image portion has little useful information, and an image distortion is large. Therefore, these regions are set to the outside of a conversion region, or the outside of a characteristic line extraction range utilizing mask information and the like from the beginning, and the process can be further speeded up. In this case, the process by one-dimensional data is performed, and is very simple.

Next, the initialization process 74 in the first frame 0 in the camera posture estimation section 70 will be described.

The camera posture estimation section 70 continues pursuing the characteristic point information from when the characteristic point appears until the point disappears, and continues updating the three-dimensional information of the characteristic point. Furthermore, when another characteristic point appears, the three-dimensional information of the present characteristic point information is taken over to thereby continue updating the camera frame information. However, any characteristic point does not have any three-dimensional information at a time when the spatial posture sensor first starts, and therefore each characteristic point is capable of acquiring relative depth information only. Therefore, a process is performed to impart the depth information to one or more known characteristic points in the initialization process 74.

For example, to utilize this movement detection device as a detection device of physical movement, an identification mark having a known size is attached to such a portion that at least a part of a wearer's body is visible from the movement detection device attached to the hand, head or the like. Examples of this identification mark include a characteristic point mark distant at a known interval, an identification mark shaped to have a certain known size and the like.

It is to be noted that the initialization process 74 is performed, for example, in a state of a power-on reset process after a power supply is input, a forcible reset process by a reset switch or the like. In the initialization process 74, the wearer performs this process in a position in which the identification mark is input into the image pickup section 40.

Moreover, as shown in FIG. 2, to utilize an operation input device capable of recognizing a hand shape or the like, the initialization process can be performed in a case where a hand reset gesture operation (e.g., an operation at a time when the shape of the hand is changed like a stone or paper is defined beforehand as a reset operation) is recognized. After the image pickup section 40 detects these identification marks at the time of the initialization process, depth information z of the characteristic point extracted from the identification mark by the known size is initially registered. In and after this process, the camera posture estimation section 70 establishes a correspondence between the depth information and another characteristic point information, while updating the camera frame.

That is, in this initialization method, the initialization process does not have to be performed in a specific place where there is a special mark, and the initialization process can be easily performed anywhere at any time.

Next, a second method of the initialization process will be described. In this second method, the identification mark is attached to a part of the wearer's body in the same manner as in the above-described method, but information such as a size and interval is not required. That is, in the second method, a physical pause at the time of the above-described initialization operation is performed in a certain determined state (e.g., a certain determined hand position/posture or head position/posture) to thereby perform the initialization process. In this case, a pendant or the like constituting the identification mark is attached, for example, to the chest. Next, the wearer who wears the operation input device performs the reset gesture operation in a predetermined position before the body. In this initialization process, the image pickup section 40 disposed on a hand back portion recognizes the characteristic point of a predetermined image input region, and registers the depth information z with a known value. Therefore, the wearer needs to measure the initialization pause and a distance between the image pickup section 40 at this time and the known characteristic point beforehand to input the values as initial values beforehand.

That is, even in the second method of the initialization process, the size, distance, shape and the like of the characteristic point do not have to be recognized. That is, since the position of the characteristic point may be recognized, the identification mark can be formed to be small.

Next, in a third method of the initialization process, any special identification mark does not have to be put on the body, and the characteristic point is utilized assuming that the size or positional relation of the body itself is known. There are two types of methods in the same manner as described above.

First, in a first method, a dimension of a portion which is an initial characteristic point in the wearer's body is measured beforehand, and initially registered. For example, when eyes in the face are used as characteristic points, a distance of an eye width is utilized. A width of the face, shoulder width or the like may be used as a known distance.

In another method of the third method, when the wearer performs an initializing operation in a predetermined pause, a characteristic point position of a part of the body is constantly extracted from a constant distance, and the characteristic point position is input into the image pickup section 40. For example, in an initializing operation at a time when the hand is extended before the body, the distance of the head is registered as a known distance, or opposite hands are opened at a certain interval, and a gesture for measuring a distance from the position of one hand to that of the other hand is set as the initializing pause, and accordingly the known distance is registered.

When this operation is performed by the above-described operation input device, the reset gesture operation is performed in the determined position before the body. Then, the image pickup section 40 disposed on a hand back part constantly extracts an image (characteristic point image) of the face in certain ranges of the azimuth and incidence angle, and the characteristic point is registered as known characteristic point information. That is, in this method, a searching range of the known characteristic point at the time of the initialization can be limited.

It is to be noted that it is naturally possible to combine both the methods into a method, the known interval and the known distance information of the characteristic point are initially registered, and accordingly precision can be raised.

According to the third method, the initialization process can be performed without attaching any special identification mark forming the characteristic point to the body, and further operability can be enhanced.

Further in a fourth method of the initialization process, a relation between ambient environment at the initialization time and the posture is utilized. To perform this operation by the operation input device, it is predetermined that the posture at the time of the reset gesture operation be performed, for example, in a standing-up state, further a state of the hand back directed downwards, or such a posture that information at feet can be seen by the image pickup section 40. Furthermore, a distance from the hand back to a floor is measured beforehand in this posture, and initially registered. The characteristic point extracted from the image in a feet direction at this time is registered approximately as the characteristic point of the known distance information.

Moreover, in the movement detection device attached to the head or the like, height data in a standing-up state can be utilized as the distance information. The image of the feet or ceiling direction can be detected by the information of the acceleration sensor 20 in the spatial posture sensor 1 even with respect to a change of the peripheral image by bending of the neck or the like, and therefore the characteristic point forming the image information of the feet or the ceiling can be identified. Therefore, the distance to the characteristic point can be estimated from angle information of the characteristic point from the head to the feet or the ceiling with respect to the gravity axis and the distance between the spatial posture sensor 1 and the feet or the ceiling. That is, this characteristic point can be used as the characteristic point from which the depth information is constantly known in a process other than the initialization process. Additionally, this utilization method is performed on conditions that the feet are opened to a certain degree, or the method is utilized in a limited environment such as inside of a room having a ceiling.

Next, in a fifth method of the initialization process, an operation such as a gesture to perform a known motion beforehand is performed as an initialization operation to thereby perform the initialization process.

To perform this operation with the above-described operation input device, the initialization process is started first by an initialization start gesture operation (e.g., a stone/paper operation is performed as a start operation) as the initialization process. Moreover, after the wearer moves the hand to an end position from a preset initial position, input of initialization information is ended by an initialization end gesture operation (e.g., the paper/stone operation is performed as an end operation). It is to be noted that in this motion, it is important that a linear distance connecting the first motion to the last motion be constantly certain and a known distance. For example, a moving distance by a series of motions from a state in which the hand is fully extended forwards until the hand reaches the body can be used as approximately constant distance information.

Known movement distance information is added to a motion parameter of characteristic point information from the peripheral image processed between the start and the end of the above-described series of initialization gesture motion and depth estimation information, and accordingly the depth information of the respective characteristic points can be registered. That is, in this method, the dimension of the body or the positional relation information is not directly utilized, and body information such as a movement range of a physical operation part is utilized.

As described above, in the initialization process 74, the initial registration of the depth information z with respect to the initial characteristic point is possible in various methods. It is to be noted that these initialization methods can be used alone, but may be combined and used, respectively. The method to utilize can be changed by the gesture motion at the initialization time.

Next, the spatial posture sensors 1 of the present embodiment are attached to not only the hand or head but also the physical part to be measured, and can be accordingly utilized as physical movement detection devices capable of measuring spatial posture of the part with six degrees of freedom.

In this case, it is not necessary to install a signal source forming a reference in the vicinity or periphery as in a sensor utilizing light or magnetism, and the device can be used anywhere. Even when a plurality of physical movement detection devices are simultaneously attached, the devices can be utilized without any mutual interference or drop of a data update rate.

Moreover, when the movement detection device shown in FIG. 5 of the present embodiment is attached to a terminal end portion of an imaginary or actual writing instrument, the movement of a pen tip in a writing state can be measured, and this movement detection device can be utilized in a pen input type operation input device.

Furthermore, when the movement detection device of the present embodiment is attached to a digital camera or the like, spatial posture information is simultaneously recorded at the time of continuous photography of the image, and the device is used in the information to reconstruct the three-dimensional information of the object of the photography image based on the photography image and the spatial posture information, the movement detection device of the present embodiment can be utilized in a 3D model data construction camera system.

As described above, the movement detection device of the present embodiment is directly attached to the body and utilized, and additionally attached to a tool which is attached to the body or held in the hand and utilized, and accordingly the movement itself can be measured.

Here, as another example of the self-sustaining movement detection section 2 in the present embodiment, a section using a geomagnetic sensor will be described.

The geomagnetic sensor is capable of detecting an intensity of magnetism with respect to a direction of a generally north pointing geomagnetic vector of the earth by information output from magnetoresistive elements (hereinafter referred to as the MR elements) disposed along three axes with respect to geomagnetism on the earth. Accordingly, the geomagnetic vector can be obtained from three signals of each MR element.

Additionally, in the geomagnetic vector, a slight error called declination inherent in each district on the earth exists with respect to the north geographically. Furthermore, the geomagnetic vector has a tilt called an elevation angle in a vertical plane, inherent in each district on the earth. For example, this elevation angle is directed downwards by around 48 degrees with respect to the north direction around Tokyo.

Therefore, these errors have to be corrected beforehand in a posture detection device for use in a car navigation system or the like. However, in an application to detect a relative movement state as in the movement detection device of the present embodiment, the device is only utilized as reference vector information in a certain local space, and therefore any precision in an absolute direction is not required.

Therefore, when the geomagnetic vector information is compared, for example, with information of an angular velocity sensor, errors by drifts of the angular velocity sensor can be detected. A time when angle data as integration information of the angular velocity sensor is reset is regarded as an initial state, and the geomagnetic vector at this time is measured beforehand. Furthermore, the elevation angle of the place is checked beforehand, and accordingly an absolute azimuth may be set by comparison with gyro integration results, or reference correction is also possible. A gravity vector direction can also be known.

Furthermore, when geomagnetic vector information by a triaxial geomagnetic sensor and gravity vector information by a triaxial acceleration sensor is utilized, a movement detection device using two vectors as references can be constituted, and the posture or movement can be detected more correctly. Furthermore, when the triaxial angular velocity sensor is added to this constitution, a self-sustaining inertial movement detection section having higher-rate response characteristics and high resolution can be constituted.

Moreover, two all azimuth image sensors each having an incidence field angle θ of ±90° in the above-described embodiment are disposed while center optical axis directions are matched and an incident direction is directed in an opposite direction. Accordingly, it is possible to construct a real all azimuth image sensor capable of projecting images virtually from all 360° directions. In this case, even in the panorama image, the projected images can be displayed in all image regions, the characteristic points are further prevented from being eliminated from a camera view field, and it is possible to continue tracing the posture information more correctly.

Next, an embodiment of communication using an interface of radio communication with a PC utilizing these operation input devices will be described.

The communication with usual radio waves is broadly non-directive communication. In this case, the apparatus may be in any posture or movement state within a communicable range, and is a communication system conveniently used as the interface of the operation input device. However, if there are many apparatuses which become receiving devices nearby, interference of radio waves or collision of signals occur, and some handling operation is required for establishing and switching communication connection. Additionally, in a roaming system which automatically switches connection, there is a possibility that an identical person is connected regardless of the person's intention, and this cannot be a method of solving the problem.

On the other hand, in an optical communication system such as IrDA communication, generally unless optical axes of light receiving/emitting means are mutually matched, and each apparatus is disposed within a transmittable/receivable distance, communication cannot be established. This state has to be continued to be kept even when the communication is performed, and the convenience of use is unsatisfactory as compared with radio waves, and problems of interference and the like are few.

Therefore, a communication apparatus of the present embodiment comprises two communication means. For one thing, non-directive communication means (non-directive radio communication means) by the radio waves is disposed. For example, short-distance radio communication means such as a radio LAN, Bluetooth, and PHS are considered. Furthermore, communication means (directive radio communication means) by light is disposed as the communication apparatus of the operation input device of the present embodiment. This is communication means having directivity in a certain angle range with infrared light such as IrDA.

It is to be noted that two types of radio communication means of the radio waves and light are similarly disposed also in a computer device (hereinafter referred to as the PC) which is a communication target.

That is, optical communication means having intense directivity is used in establishing the communication. At this time, when an IrDA transmitting/receiving device of the operation input device is directed toward an IrDA transmitting/receiving section of the PC to be operated by an operator, a procedure to establish both communications is performed, the communication connection is automatically performed, and a state in which the operation by the operation input device is possible is brought about.

After the communication connection is once established, the communication by the light is not used in the subsequent communication of the information, and mutual data communication by the communication by the radio waves is performed.

That is, after the connection, the operator does not have to constantly direct the operation input device toward the IrDA transmitting/receiving section of the PC or care about any communication reaching distance. Furthermore, the communication connection is maintained in any posture or movement state, and the operation by the operation input device is possible.

Moreover, to operate another PC, the IrDA transmitting/receiving section is directed toward the IrDA transmitting/receiving section of the PC which is the operation object in the same manner as described above, and accordingly the PC can be easily switched to the target PC.

Next, a process procedure of the operation input device capable of communicating with a plurality of PCs at a communication switching time will be described. It is to be noted that there are three communication establishing modes as follows, and the operator sets the mode for use from the three modes beforehand.

Figure 18:
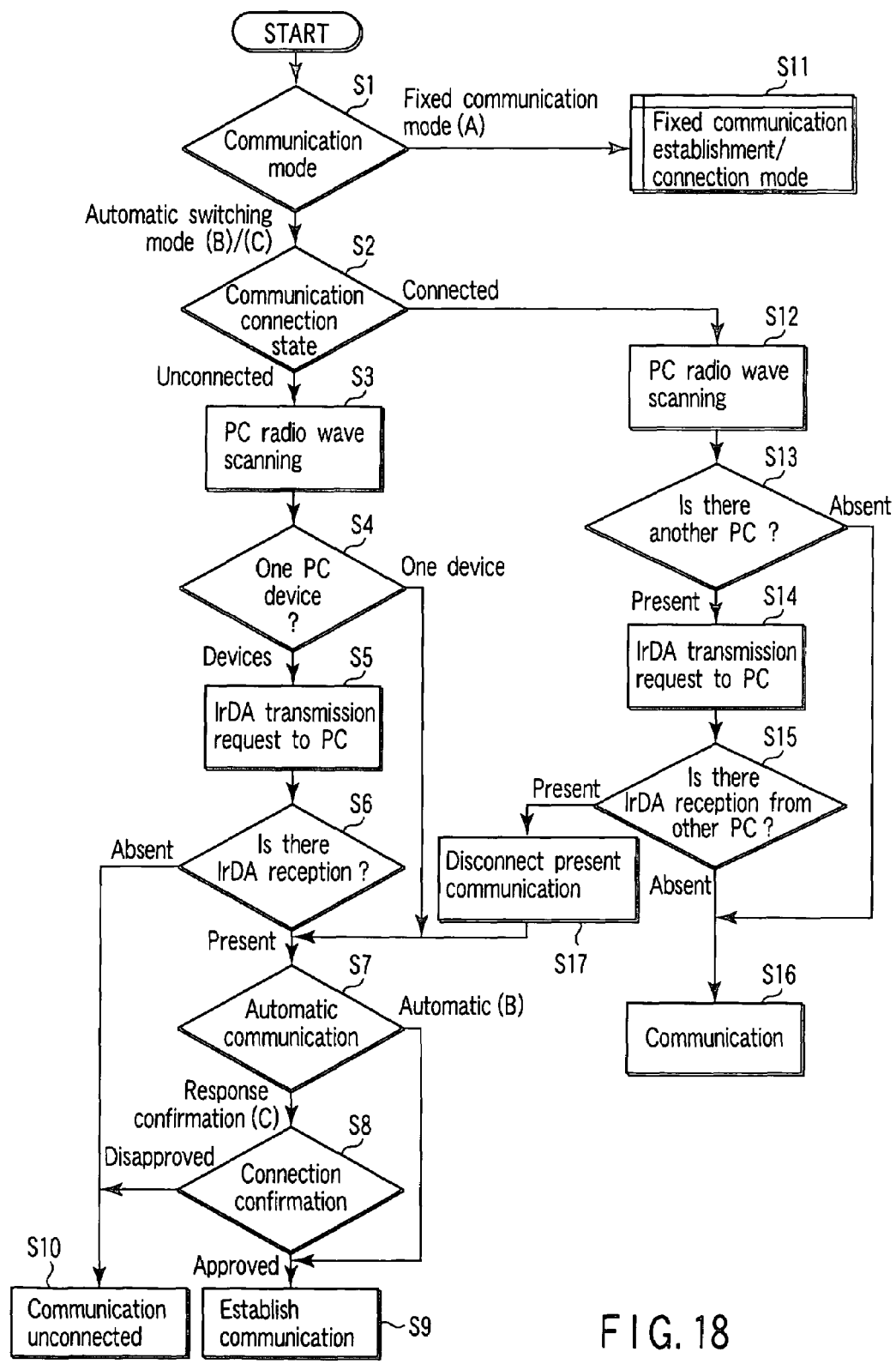
FIG. 18 is a flowchart of a radio communication function on an operation input device side according to the embodiment of the present invention.

(A) PC fixed communication mode . . . mode in which connecting or searching is not performed with respect to the other apparatus once the communication is established (B) PC automatic switching mode . . . mode capable of automatically switching the communication target without fixing the target (C) PC switching confirmation mode . . . mode in which the switching is possible without fixing the communication target but confirmatory response is made at the switching time Here, a flow of a main process on the side of the operation input device at the communication time of the communication apparatus of the present embodiment will be described with reference to FIG. 18.

First, the operation input device judges that its own communication mode is one of the above-described (A) to (C) modes (S1). When the communication mode is the (B) or (C) mode, the present communication connection state is judged (S2).

When the present communication state is an unconnected state, the radio waves of the PC existing around the operation input device are scanned (S3), and it is judged whether or not only one PC has a connection preparing state around the operation input device (S4). When only one PC has the connection preparing state, the process shifts to S7. On the other hand, when a plurality of PCs in the connection preparing states exist in the judgment of S4, after sending commands requesting transmission by the IrDA of the PCs to the PCs in the connection preparing states (S5), reception of the IrDA from the PC is waited for (S6). The PC which has received the transmission request transmits an IrDA communication establishment message together with its own ID via infrared light. When it is judged in the judgment of S6 that the IrDA transmitting/receiving section of the operation input device is in the vicinity of the IrDA transmitting/receiving section of the PC, and an infrared signal of the PC can be received, the process shifts to S7.

The present communication mode is judged in S7, and it is judged whether automatic communication is performed as such ((B) mode) or confirmation is performed before performing the communication ((C) mode) (S7). In the (C) mode, it is confirmed with respect to the operator whether or not the communication connection is performed (S8). Moreover, when the (B) mode is judged in the judgment of S7, or the communication connection is approved in the judgment of S8, the communication connection is established (S9).

On the other hand, when it is judged in S6 that there is not any reception of the IrDA from the PC, or when the communication connection is disapproved in S8, the communication is unconnected (S10).

On the other hand, when the communication is connected in S2, the radio waves of the PC existing around the operation input device are scanned (S12), and it is judged whether or not the PC other than the communicating PC exists now (S13). When there is only one PC, the process shifts to S16. On the other hand, when another PC exists in the judgment of S13, a transmission request command by the IrDA of the PC is sent to the PC prepared for the connection via the radio waves (S14), and the reception of the IrDA from the PC is waited for. When there is the reception of the IrDA from the PC, the ID of the PC is read from the signal, and it is judged whether or not the received IrDA is received from the other PC (S15). When it is judged in S14 that any other PC does not exist, or it is judged in S15 that there is not any reception of the IrDA from the other PC, the present communication is maintained (S16). On the other hand, when it is judged in S15 that there is the reception of the IrDA from the other PC, the present communication is disconnected (S17), and thereafter the process shifts to S7.

Moreover, when it is judged that its own communication mode is the (A) mode in the judgment of S1, the process of the (A) mode is performed (S11). The process of the (A) mode will be briefly described. First, the radio waves from the peripheral PC are scanned, the transmission request for the IrDA is sent to the scanned PC via the radio waves. When the IrDA is received from the PC, the communication connection is established as such, and thereafter the communication is maintained.

Here, emission of the infrared light at the connection switching time is under the control of a PC side. This is a measure for reducing power consumption of the operation input device. When the power consumption of the operation input device does not have to be considered, the infrared light is emitted from an operation input device side, and the PC may be switched.

In this manner, the PC to be used can be easily switched by the operator's own will by a very simple and understandable gesture motion of directing the operation input device toward the PC to use (i.e., a motion to bring the IrDA transmitting/receiving section of the operation input device close to that of the PC in such a manner that the communication by the infrared light is performed).

Moreover, when these motions are utilized, a data object on a certain PC(A) screen is copied by the operation input device (e.g., a grasping gesture operation), and moved as such onto the screen of another PC(B) and pasted (e.g., a releasing gesture operation), and this copy & paste operation or the like over the PCs by the gesture operation can be performed by a daily motion sense.

Here, electromagnetic waves such as light and radio waves or sound waves such as ultrasonic waves may be used as conveying media for use in the radio communication. Different wavelengths may be utilized even in the same conveying media. That is, the same conveying media are possible, when directive and non-directive functions can be utilized as in the above-described example.

According to the present invention, there can be provided a movement detection device capable of correctly recognizing a spatial position, posture, and movement of a moving object.

Especially according to a first invention, there can be provided a movement detection device capable of correctly measuring a position/posture of a measurement object.

Moreover, according to second to fourth inventions, movement can be detected utilizing an angular velocity sensor, an acceleration sensor, and a geomagnetic sensor without requiring any self-sustaining reference transmitter.

Furthermore, according to a fifth invention, images from whole sky periphery can be simultaneously projected and taken in by all azimuth image pickup means.

Additionally, according to a sixth invention, in center projection in which a projected image by a four-surface plane mirror is divided into five regions, a spatial position direction of a characteristic point can be obtained by a linear conversion equation of image information. All azimuth image pickup means can be constructed by a combination with a simple optical system by the plane mirror.

Moreover, according to a seventh invention, the images from the whole sky periphery can be simultaneously projected by a curved surface mirror, and taken in as continuous images.

Furthermore, according to an eighth invention, the images from the whole sky periphery can be simultaneously projected by one of a fisheye lens, an equidistance projection lens, and an equi-solid-angle projection lens, and taken in.

Additionally, according to a ninth invention, when two all azimuth image sensors are disposed in opposite directions and used, the images from a true whole sky periphery (all directions) can be simultaneously projected and taken in.

Moreover, according to a tenth invention, since an image is converted into a gravity correction panorama image in consideration of a direction of a vector of a gravity axis direction and a rotation angle around a gravity axis, detected by the self-sustaining movement detection means, during the conversion into a cylindrical panorama image, movement of the image by a rotating operation of the all azimuth image sensor can be canceled, and a matching process can be speeded up.

Furthermore, according to an eleventh invention, a movement of a camera frame can be estimated from movements of a plurality of characteristic points.

Additionally, according to a twelfth invention, a movement of a horizontal direction can be more easily estimated from a movement of a characteristic line of a vertical direction.

Moreover, according to a thirteenth invention, a camera posture is estimated from a movement vector in an image.

Furthermore, according to a fourteenth invention, initialization does not have to be performed in a specific place having a special mark, and the initialization can be easily performed anywhere at any time.

Additionally, according to a fifteenth invention, initialization does not have to be performed in a specific place having a special mark, and the initialization can be easily performed anywhere at any time. Furthermore, even a change of a shape or the like of an identification mark can be handled.

Moreover, according to sixteenth and seventeenth inventions, any special identification mark does not have to be attached for initialization means.

Furthermore, according to an eighteenth invention, initialization can be performed without utilizing any special identification mark, and the invention may be utilized in correction of characteristic point data during measurement after the initialization.

Additionally, according to a nineteenth invention, any special identification mark does not have to be attached for initialization means.

Moreover, according to a twentieth invention, a signal source forming a reference does not have to be installed in the vicinity or periphery as in a sensor utilizing light, magnetism or the like, and a physical movement detection device can be utilized anywhere. Even when a plurality of devices are simultaneously attached, the devices can be utilized without any mutual interference or drop of a data update rate.

Furthermore, according to a twenty-first invention, a physical movement detection device is utilized and attached to the back of a hand, and movement of the hand can be measured.

Additionally, according to a twenty-second invention, a physical movement detection device is utilized and attached to a head part, and movement of the head part can be measured.

Moreover, according to the present invention, there can be provided an communication apparatus capable of easily switching connection of a plurality of PCs to an operation input device and communication setting by an operator's will.

Especially, according to a twenty-third invention, it is easy to perform communication switching operation with respect to a communication target by two types of radio communication means of non-directive communication means and directive communication means.

Moreover, according to a twenty-fourth invention, communication by radio waves can be used as non-directive communication means, and communication by light can be used as directive communication means.

What is claimed is:

1. A movement detection device to detect a position/posture of an object itself which is equipped with a self-sustaining movement detection section that does not require any other reference device, the movement detection comprising:
an image pickup section fixed to the self-sustaining movement detection section, which projects an image from around the object to continuously pick up the projected image;
an image conversion section which converts the projected image picked up by the image pickup section into a cylindrical panorama image;
an image recognition section which compares and recognizes two cylindrical panorama images converted at different times by the image conversion section;
a camera posture estimation section which estimates position/posture information of the object based on a recognition result of the image recognition section; and
a space sensor posture estimation section which estimates the position/posture of the object in a space based on a detection result of the self-sustaining movement detection section and an estimation result of the camera posture estimation section,
wherein the image conversion section converts the image into a gravity correction panorama image in consideration of a direction of a vector of a gravity axis direction and a rotation angle around a gravity axis, detected by the self-sustaining movement detection section, when converting the image picked up by the image pickup section into the cylindrical panorama image.

2. The movement detection device according to claim 1, wherein the self-sustaining movement detection section comprises a combination of at least two of an angular velocity sensor, an acceleration sensor, and a geomagnetic sensor.

3. The movement detection device according to claim 1, wherein the self-sustaining movement detection section comprises an angular velocity sensor whose three axes cross one another at right angles and an acceleration sensor whose at least two axes cross one another at right angles.

4. The movement detection device according to claim 1, wherein the self-sustaining movement detection section comprises an angular velocity sensor whose three axes cross one another at right angles and a geomagnetic sensor whose at least two axes cross one another at right angles.

5. The movement detection device according to claim 1, wherein the image pickup section comprises an all azimuth image pickup section which projects an all azimuth image from around the object, and which continuously picks up the projected image.

6. The movement detection device according to claim 5, wherein the all azimuth image pickup section comprises an optical system which projects the image from around the object using a plane mirror having at least four surfaces.

7. The movement detection device according to claim 5, wherein the all azimuth image pickup section comprises an optical system which projects the image from around the object using a curved-surface mirror.

8. The movement detection device according to claim 5, wherein the all azimuth image pickup section comprises an optical system which projects the image from around the object using one of a fisheye lens, an equidistance projection lens, and an equi-solid-angle projection lens.

9. The movement detection device according to claim 5, wherein the all azimuth image pickup section comprises two all azimuth image pickup sections whose optical axes match each other and whose optical axis directions are opposite to each other.

10. The movement detection device according to claim 1, wherein prior to estimation of position/posture information of the object, the camera posture estimation section newly registers a characteristic point in the cylindrical panorama image, registers three-dimensional information viewed from a frame image and a present camera frame as characteristic point information in the new registration of the characteristic point, traces the characteristic point from when the characteristic point appears until the point disappears, accordingly updates the three-dimensional information viewed from the frame image, further registers three-dimensional information of another characteristic point obtained from the present camera frame, when said another characteristic point appears, accordingly traces positions of a plurality of characteristic points disappearing or appearing in continuous images, and acquires the present camera frame with respect to a world coordinate space from movements of the plurality of characteristic points.

11. The movement detection device according to claim 1, wherein the camera posture estimation section extracts a plurality of line segments of a vertical direction from the gravity correction panorama image obtained by the image conversion section and which traces positions in the gravity correction panorama image obtained by the image conversion section at different times, where the plurality of extracted line segments exist, to thereby estimate the position/posture information of the object.

12. The movement detection device according to claim 1, wherein the camera posture estimation section estimates the position/posture information of the object by an optical flow in the gravity correction panorama image obtained by the image conversion section.

13. The movement detection device according to claim 1, further comprising an initialization section which takes in an image, by the image pickup section at an initialization time of the movement detection device, of an identification mark for characteristic point recognition, having a known size or a known interval, and which obtains depth information from the size or the interval of the taken-in image of the identification mark for the characteristic point recognition to initialize/register the depth information.

14. The movement detection device according to claim 1, further comprising an initialization section which takes in an image, by the image pickup section at an initialization time of the movement detection device, of an identification mark for characteristic point recognition, disposed in a predetermined position, from a position distant from the identification mark for the characteristic point recognition by a known distance, and which initializes/registers depth information of the characteristic point at this time.

15. The movement detection device according to claim 1, further comprising an initialization section which takes in an image of a part or all of a body by the image pickup section at an initialization time of the movement detection device, and which initializes/registers depth information of the characteristic point obtained from the taken-in image and a pre-registered size or a shape of the part or all of the body.

16. The movement detection device according to claim 1, further comprising an initialization section which takes in an image, by the image pickup section at an initialization time of the movement detection device, of a characteristic part of a body from a known distance, and which initializes/registers depth information of the characteristic point based on the taken-in image.

17. The movement detection device according to claim 1, further comprising an initialization section which takes in an image, by the image pickup section at an initialization time of the movement detection device, having a predetermined direction and distance from a part to which the movement detection device is attached, and which initializes/registers depth information of the characteristic point in the taken-in image.

18. The movement detection device according to claim 1, further comprising an initialization section which takes in an image, by the image pickup section at an initialization time of the movement detection device, at a time of performing an operation to move a part to which the movement detection device is attached by a predetermined distance, and which initializes/registers depth information of the characteristic point in the taken-in image.

19. A movement detection device which detects a movement or a posture of a part of a body to which the movement detection device is attached, when the movement detection device comprises the movement detection device according to claim 1, which is attached to the part of the body.

20. A movement detection device which detects a movement or a posture of a hand of an object to which the movement detection device is attached, when the movement detection device comprises the movement detection device according to claim 1, which is attached to the back of the hand.

21. A movement detection device which detects a movement or a posture of a head part of an object to which the movement detection device is attached, when the movement detection device comprises the movement detection device according to claim 1, which is attached to the head part.

* * * * *